United States Patent
Kagan

(10) Patent No.: US 10,089,652 B2
(45) Date of Patent: Oct. 2, 2018

(54) GENERATING ADVERTISEMENTS FOR SEARCH RESULTS THAT REFERENCE SOFTWARE APPLICATIONS

(71) Applicant: Samsung Electronics Co., Ltd., Suwon-si, Gyeonggi-do (KR)

(72) Inventor: Tomer Kagan, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 638 days.

(21) Appl. No.: 14/682,791

(22) Filed: Apr. 9, 2015

(65) Prior Publication Data

US 2015/0371263 A1    Dec. 24, 2015

Related U.S. Application Data

(60) Provisional application No. 62/016,352, filed on Jun. 24, 2014.

(51) Int. Cl.
*G06Q 30/00* (2012.01)
*G06Q 30/02* (2012.01)
*G06F 17/30* (2006.01)
*H04W 4/60* (2018.01)

(52) U.S. Cl.
CPC ..... *G06Q 30/0256* (2013.01); *G06F 17/3087* (2013.01); *G06F 17/30867* (2013.01); *G06Q 30/0267* (2013.01); *H04W 4/60* (2018.02)

(58) Field of Classification Search
CPC .................................. G06Q 30/0256
USPC .......................................... 705/14
See application file for complete search history.

(56) References Cited

U.S. PATENT DOCUMENTS

| | | |
|---|---|---|
| 2011/0307313 A1 | 12/2011 | Ju |
| 2012/0023097 A1 | 1/2012 | LeBeau et al. |
| 2012/0316955 A1* | 12/2012 | Panguluri ............. G06Q 30/02 705/14.41 |
| 2013/0138674 A1 | 5/2013 | Jeong et al. |
| 2014/0040307 A1* | 2/2014 | Kavety Loganathan .................... G06F 17/30864 707/769 |
| 2014/0280339 A1* | 9/2014 | Jain ................... G06F 17/30864 707/775 |

(Continued)

OTHER PUBLICATIONS

International Search Report and Written Opinion for related WO Application No. PCT/US2015/036631, dated Sep. 25, 2015.

*Primary Examiner* — Matthew L Hamilton
(74) *Attorney, Agent, or Firm* — Jefferson IP Law, LLP

(57) ABSTRACT

Techniques include receiving a search query from a user device and performing a search of a data store using the query. The data store includes function records that each include an application access mechanism (AAM) that specifies a native application and indicates one or more operations for the application to perform, and application state information (ASI) that describes a state of the application after it has performed the operations. The techniques further include identifying a function record during the search based on matches between terms of the query and terms of the ASI of the function record. The techniques include selecting the AAM of the identified function record, and determining that the native application specified by the AAM is unavailable on the user device. The techniques also include generating an advertisement for the unavailable application and transmitting the AAM and the advertisement to the user device.

18 Claims, 15 Drawing Sheets

(56) References Cited

U.S. PATENT DOCUMENTS

| | | | |
|---|---|---|---|
| 2014/0358910 A1* | 12/2014 | Frigon | G06F 17/3053 707/723 |
| 2014/0358970 A1* | 12/2014 | Morris | G06F 17/30392 707/772 |
| 2014/0372218 A1* | 12/2014 | Talluri | G06Q 30/0256 705/14.54 |
| 2015/0186940 A1* | 7/2015 | Harris | G06Q 30/0256 705/14.54 |
| 2016/0034958 A1* | 2/2016 | Kagan | G06O 30/0256 705/14.54 |
| 2016/0148262 A1* | 5/2016 | Glover | G06Q 30/0256 705/14.54 |
| 2017/0177319 A1* | 6/2017 | Mark | G06F 8/61 |

* cited by examiner

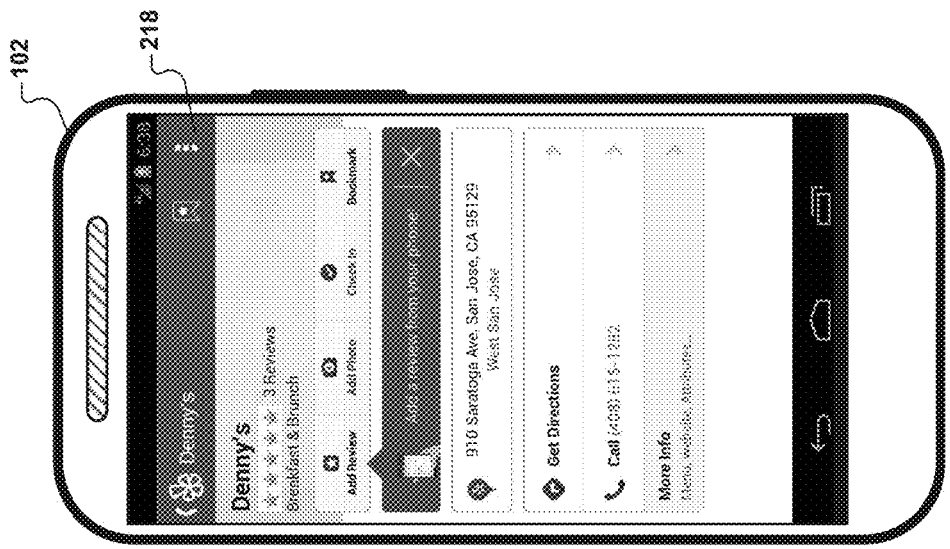
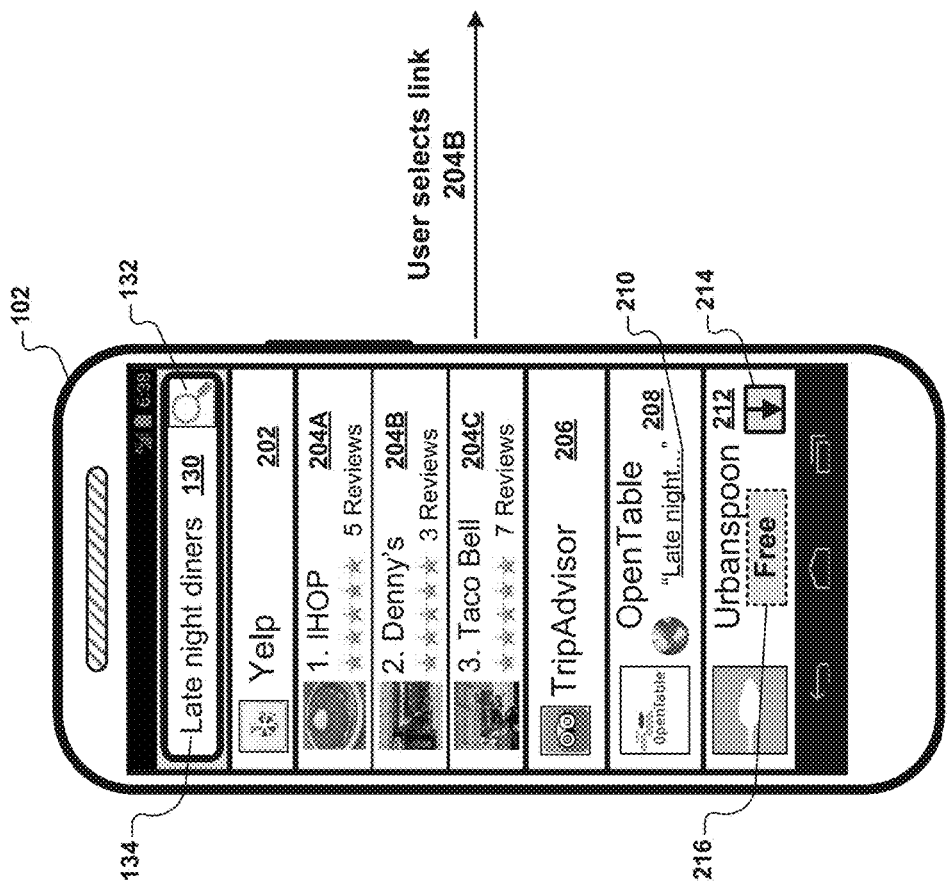
FIG. 10B
FIG. 10A

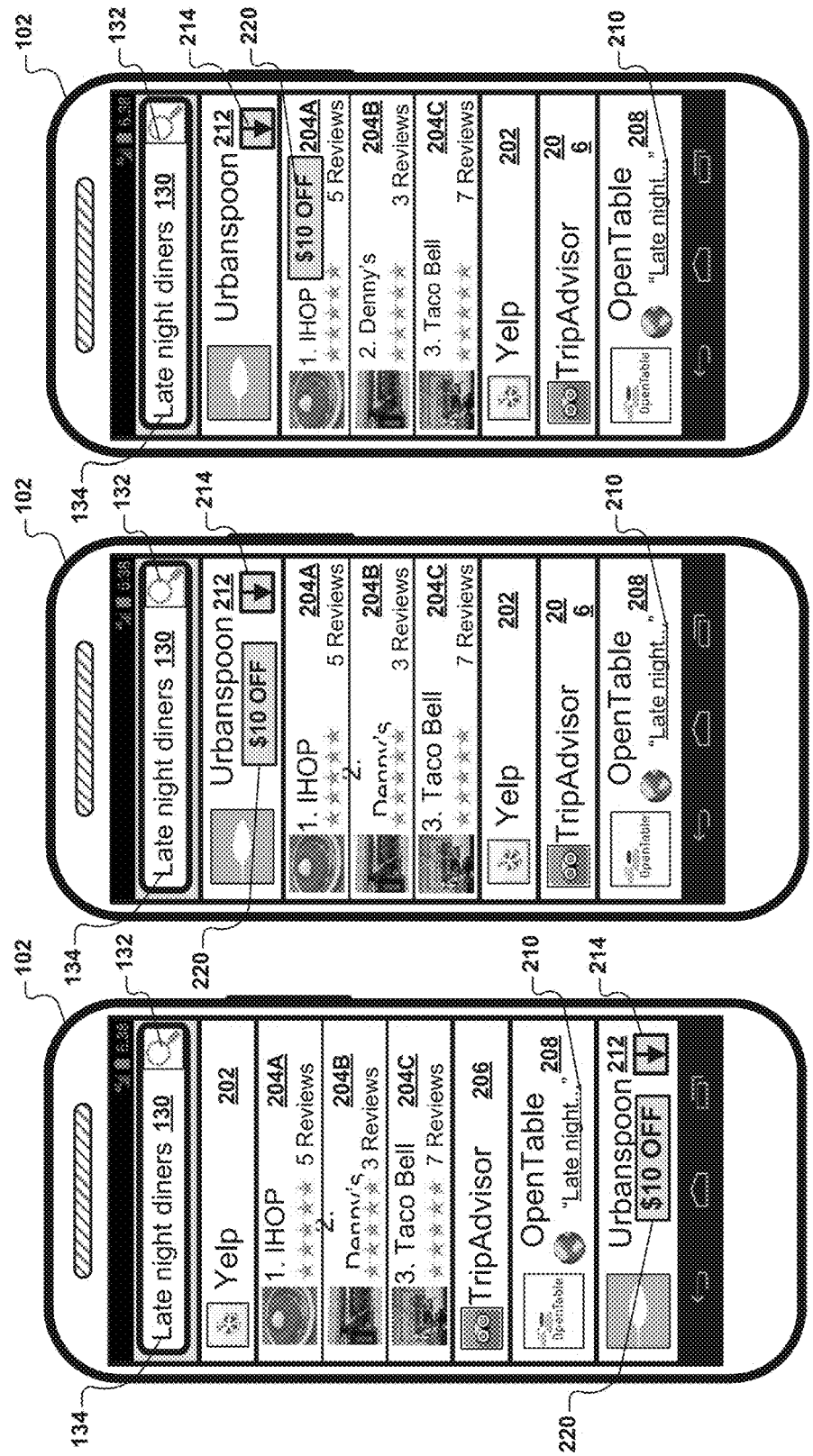

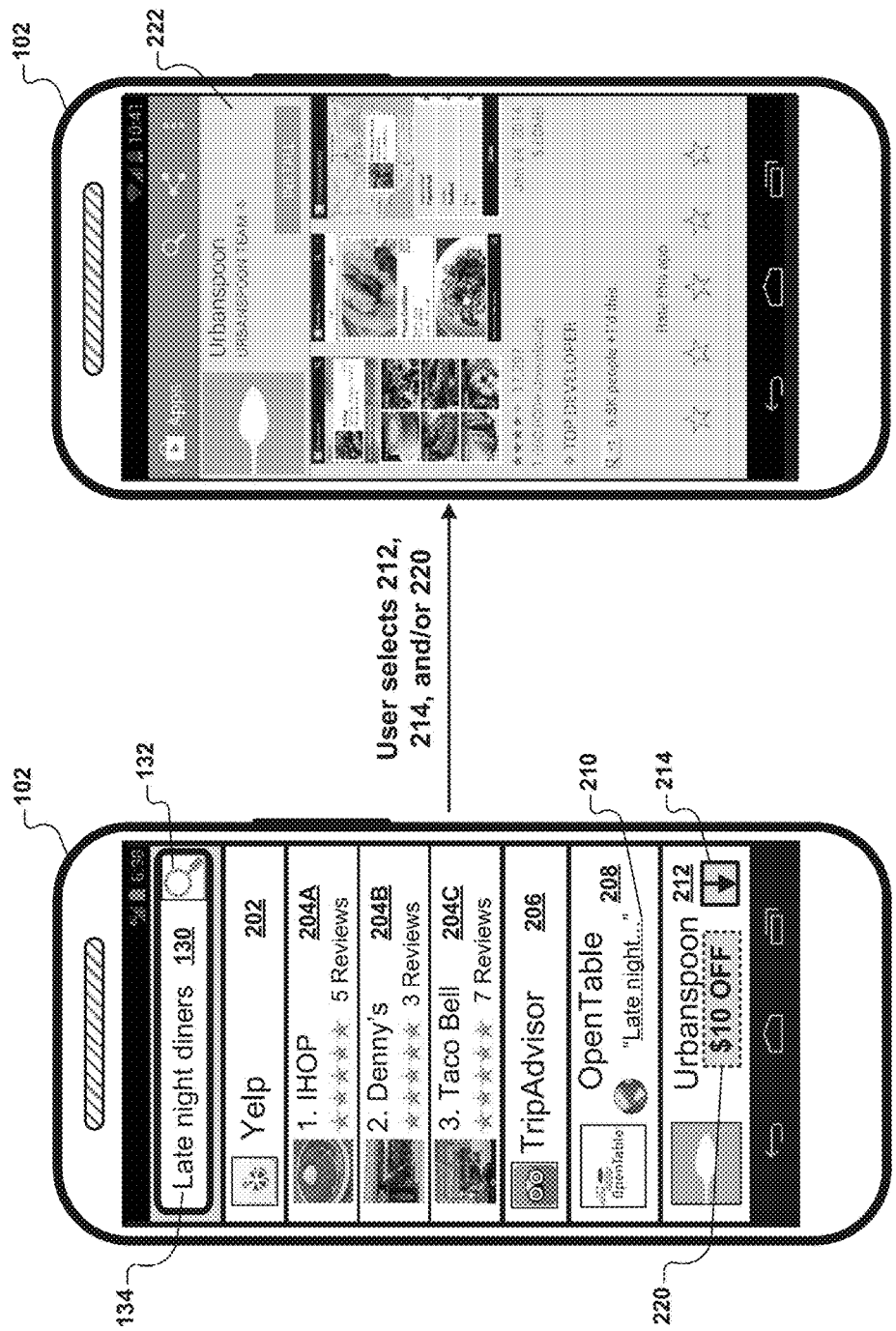

GENERATING ADVERTISEMENTS FOR SEARCH RESULTS THAT REFERENCE SOFTWARE APPLICATIONS

CROSS-REFERENCE TO RELATED APPLICATION

This application claims priority under 35 U.S.C. § 119(e) to U.S. Provisional Application No. 62/016,352, filed Jun. 24, 2014, which is hereby incorporated by reference in its entirety.

TECHNICAL FIELD

This disclosure generally relates to the field of search, and more particularly to techniques for displaying advertisements along with search results.

BACKGROUND

In recent years, the use of computers, smartphones, and other Internet-connected computing devices has grown significantly. Correspondingly, the number of available software applications for such devices has also grown. Today, many diverse applications can be accessed on a number of different devices, including, but not limited to, smartphones, personal computers, automobiles, and televisions. These applications can include business driven applications, games, educational applications, news applications, shopping applications, messaging applications, media streaming applications, and social networking applications, as some examples. Application developers advertise many applications across a variety of different computing platforms to promote installation and use of the applications. In order to efficiently and effectively advertise the applications to users, the application developers may advertise to targeted audiences, which may include specific groups of users or user device types.

SUMMARY

One aspect of the disclosure provides a method that includes receiving a search query from a user device and performing a search of a data store using the search query. In this example, the data store includes function records. Each function record includes an application access mechanism (AAM) that specifies a native application and indicates one or more operations for the native application to perform, and application state information (ASI) that describes a state of the native application after the native application has performed the one or more operations. The method further includes identifying one or more function records during the search of the data store based on matches between terms of the search query and terms of the ASI included in each identified function record. The method also includes selecting one or more AAMs from the identified one or more function records, and determining that a native application specified by at least one of the selected one or more AAMs is unavailable on the user device. The method includes generating an advertisement for the native application that is unavailable on the user device, and transmitting the selected one or more AAMs and the generated advertisement to the user device.

Implementations of the disclosure may include one or more of the following optional features. In some implementations, determining that a native application specified by at least one of the selected one or more AAMs is unavailable on the user device includes receiving device application information that indicates one or more native applications that are available on the user device and comparing each of one or more native applications specified by the selected one or more AAMs to each of the one or more native applications indicated by the device application information. Determining that a native application specified by at least one of the selected one or more AAMs is unavailable on the user device also includes determining that a native application specified by at least one of the selected one or more AAMs is unavailable on the user device based on the comparison. Receiving the device application information may include one of: transmitting an application information query to the user device, receiving the device application information from the user device in response to the transmitted application information query, and retrieving the device application information from a device other than the user device.

In some examples, determining that a native application specified by at least one of the selected one or more AAMs is unavailable on the user device includes receiving an indication that a native application specified by at least one of the selected one or more AAMs is unavailable on the user device from the user device, after transmitting the selected one or more AAMs to the user device. Determining that a native application specified by at least one of the selected one or more AAMs is unavailable on the user device also includes determining that a native application specified by at least one of the selected one or more AAMs is unavailable on the user device based on the indication. Additionally or alternatively, the method may include transmitting link data for each of the selected one or more AAMs that includes one or more of image data and text data to be used by the user device to generate a user selectable link for the AAM.

In some examples, the method further includes transmitting an application download address (ADA) for the native application that is unavailable on the user device that indicates a web location from which the user device can download the native application. The method may further include transmitting placement information that indicates relative placement of the generated advertisement and the selected one or more AAMs on a display device. In some examples, the method further includes transmitting advertisement data that indicates one or more operations for the native application that is unavailable on the user device to perform that cause the native application to reflect one or more conditions of the generated advertisement.

In some implementations, transmitting the selected one or more AAMs and the generated advertisement to the user device includes refraining from transmitting the one or more operations indicated by the at least one of the selected one or more AAMs specifying the native application that is unavailable on the user device to the user device. The method may also include receiving an indication that the native application is available on the user device, after transmitting the selected one or more AAMs and the generated advertisement to the user device, and transmitting the one or more operations indicated by the at least one of the selected one or more AAMs specifying the native application to the user device. In some examples, the generated advertisement for the native application that is unavailable on the user device indicates a monetary discount associated with one of the native application and the state of the native application after the native application has performed the one or more operations indicated by one of the at least one of the selected one or more AAMs specifying the native application.

Another aspect of the disclosure provides a system that includes a data store storing function records. Each function record includes an AAM that specifies a native application and indicates one or more operations for the native application to perform, and ASI that describes a state of the native application after the native application has performed the one or more operations. The system also includes one or more computing devices configured to receive a search query from a user device, perform a search of the data store using the search query, and identify one or more function records during the search of the data store based on matches between terms of the search query and terms of the ASI included in each identified function record. The one or more computing devices are further configured to select one or more AAMs from the identified one or more function records, and determine that a native application specified by at least one of the selected one or more AAMs is unavailable on the user device. The one or more computing devices are also configured to generate an advertisement for the native application that is unavailable on the user device, and transmit the selected one or more AAMs and the generated advertisement to the user device.

In some examples, to determine that a native application specified by at least one of the selected one or more AAMs is unavailable on the user device, the one or more computing devices are configured to: receive device application information that indicates one or more native applications that are available on the user device; compare each of one or more native applications specified by the selected one or more AAMs to each of the one or more native applications indicated by the received device application information; and determine that a native application specified by at least one of the selected one or more AAMs is unavailable on the user device based on the comparison. In some examples, to receive the device application information, the one or more computing devices are configured to perform one of: transmitting an application information query to the user device, and receiving the device application information from the user device in response to the transmitted application information query; and retrieving the device application information from a device other than the user device.

In some implementations, to determine that a native application specified by at least one of the selected one or more AAMs is unavailable on the user device, the one or more computing devices are configured to: receive an indication that a native application specified by at least one of the selected one or more AAMs is unavailable on the user device from the user device, after transmitting the selected one or more AAMs to the user device; and determine that a native application specified by at least one of the selected one or more AAMs is unavailable on the user device based on the indication.

The one or more computing devices may further be configured to transmit one or more of an application download address (ADA) for the native application unavailable on the user device that indicates a web location from which the user device can download the native application, and advertisement data indicating one or more operations for the native application to perform causing the native application to reflect one or more conditions of the generated advertisement. In some examples, to transmit the selected one or more AAMs and the generated advertisement to the user device, the one or more computing devices are configured to refrain from transmitting the one or more operations indicated by the at least one of the selected one or more AAMs specifying the native application that is unavailable on the user device to the user device. The one or more computing devices may be further configured to: determine that the native application is available on the user device after transmitting the selected one or more AAMs and the generated advertisement to the user device; and transmit the one or more operations indicated by the at least one of the selected one or more AAMs specifying the native application to the user device.

In another example, a non-transitory computer-readable storage medium includes instructions that cause one or more computing devices to receive a search query from a user device and perform a search of a data store using the search query. In this example, the data store includes function records. Each function record includes an AAM that specifies a native application and indicates one or more operations for the native application to perform, and ASI that describes a state of the native application after the native application has performed the one or more operations. The instructions further cause the one or more computing devices to identify one or more function records during the search of the data store based on matches between terms of the search query and terms of the ASI included in each identified function record. The instructions also cause the one or more computing devices to select one or more AAMs from the identified one or more function records, and determine that a native application specified by at least one of the selected one or more AAMs is unavailable on the user device. The instructions cause the one or more computing devices to generate an advertisement for the native application that is unavailable on the user device, and transmit the selected one or more AAMs and the generated advertisement to the user device.

In another example, a method includes receiving, at a user device, a search query from a user, transmitting, using the user device, the search query to a search system, and receiving, at the user device, search results that are responsive to the search query from the search system. In this example, the search results include one or more AAMs that each specify a native application and indicate one or more operations for the native application to perform. The method further includes determining, using the user device, that a native application specified by at least one of the received one or more AAMs is unavailable on the user device. The method still further includes transmitting, using the user device, a request for an advertisement for the native application that is unavailable on the user device. The method also includes receiving, at the user device, the advertisement in response to transmitting the request, and displaying, using the user device, one or more user selectable links that include the received one or more AAMs and the advertisement to the user. In some examples, the advertisement for the native application that is unavailable on the user device indicates a monetary discount associated with one of the native application and a state of the native application after the native application has performed the one or more operations indicated by one of the at least one of the received one or more AAMs specifying the native application.

In another example, a system includes one or more computing devices configured to receive, at a user device, a search query from a user, transmit, using the user device, the search query to a search system, and receive, at the user device, search results that are responsive to the search query from the search system. In this example, the search results include one or more AAMs that each specify a native application and indicate one or more operations for the native application to perform. The one or more computing devices are further configured to determine, using the user device that a native application specified by at least one of the received one or more AAMs is unavailable on the user device, and transmit, using the user device, a request for an advertisement for the native application that is unavailable on the user device. The one or more computing devices are also configured to receive, at the user device, the advertisement in response to transmitting the request, and display, using the user device, one or more user selectable links that include the received one or more AAMs and the advertisement to the user.

In another example, a non-transitory computer-readable storage medium includes instructions that cause one or more computing devices to receive, at a user device, a search query from a user, transmit, using the user device, the search query to a search system, and receive, at the user device, search results that are responsive to the search query from the search system. In this example, the search results include one or more AAMs that each specify a native application and indicate one or more operations for the native application to perform. The instructions further cause the one or more computing devices to determine, using the user device that a native application specified by at least one of the received one or more AAMs is unavailable on the user device, and transmit, using the user device, a request for an advertisement for the native application that is unavailable on the user device. The instructions also cause the one or more computing devices to receive, at the user device, the advertisement in response to transmitting the request, and display, using the user device, one or more user selectable links that include the received one or more AAMs and the advertisement to the user.

The details of one or more implementations of the disclosure are set forth in the accompanying drawings and the description below. Other aspects, features, and advantages will be apparent from the description and drawings, and from the claims.

BRIEF DESCRIPTION OF DRAWINGS

FIGS. 10A and 10B depict example graphical user interfaces (GUIs) that may be generated on a user device according to the present disclosure.

FIGS. 11A-11C depict other example GUIs that may be generated on a user device according to the present disclosure.

FIGS. 12A and 12B depict still other example GUIs that may be generated on a user device according to the present disclosure.

Like reference symbols in the various drawings indicate like elements.

DETAILED DESCRIPTION

Figure 1:
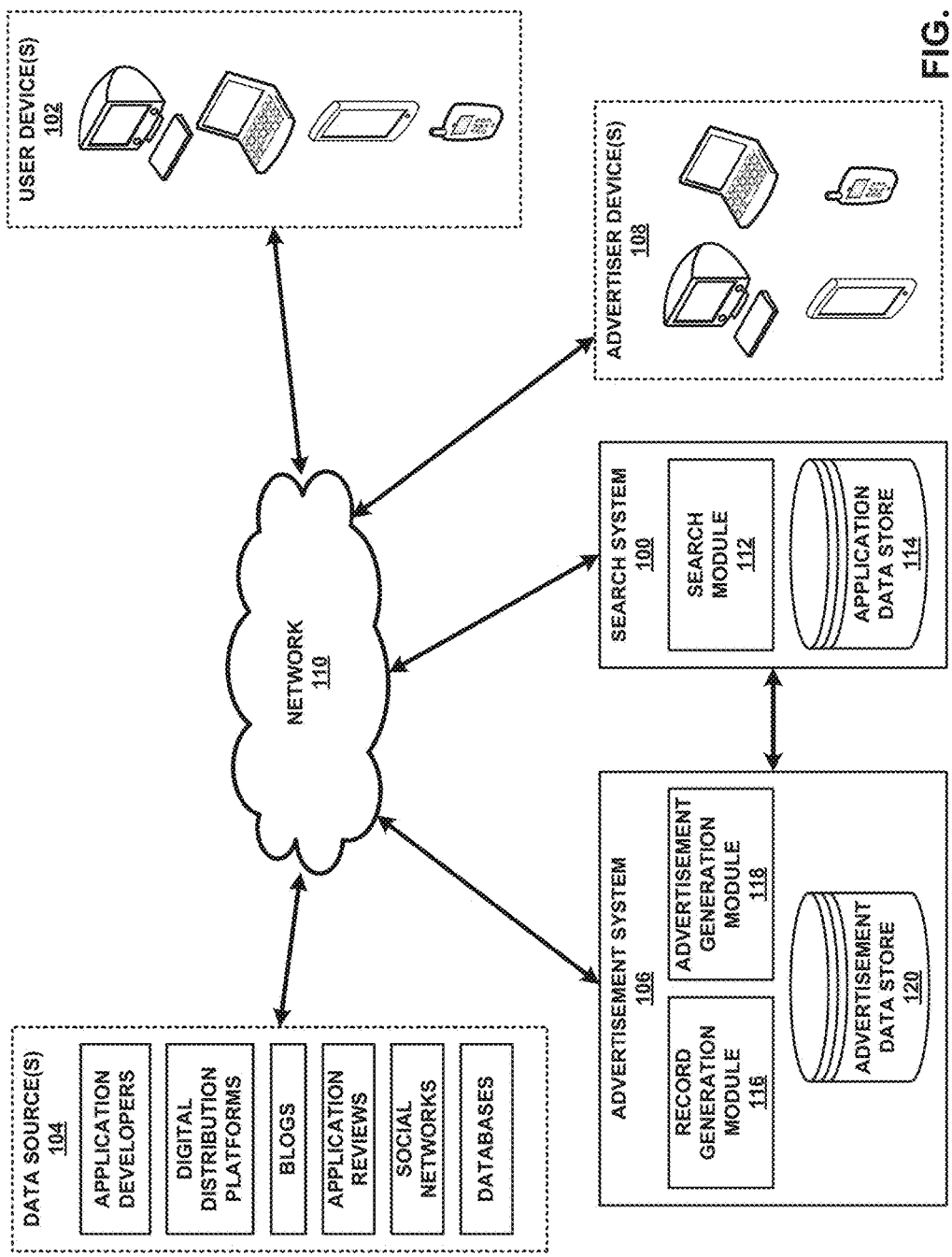
FIG. 1 depicts an example environment including a search system, an advertisement system, and one or more user devices, advertiser devices, and data sources.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of search, and, more particularly, to techniques for generating and displaying advertisements for search results that reference software applications (hereinafter, "applications"). According to the techniques of this disclosure, a user device may transmit a search query to a search system and receive search results that are responsive to the search query. The user device may then display the search results to a user of the user device. The search results may include one or more user selectable links that, when selected by the user, direct the user device to one or more application states within one or more web-based applications (i.e., applications accessible from a user device via a web browser), or within one or more native applications (i.e., applications that are installed and executed on a user device). The user selectable links may indicate (e.g., using text and/or image data) to the user the corresponding application states within the web-based or native applications.

An application state may refer to one or more web pages within a web-based application, or to one or more graphical user interfaces (GUIs), or so-called "screens," within a native application. In general, an application state of this disclosure may refer to a configuration of a web-based or native application in which the application displays content to the user, such as information related to one or more products, services, or vendors provided by, or accessible via, the application. An application state, as used herein, may also refer to a function provided by a web-based or native application. As one example, an application state of a web-based or native online shopping application may correspond to a web page or screen of the application that describes (e.g., using text and/or image data) a particular product or service sold through the application (e.g., by one or more vendors associated with the application).

In some examples, the search results include one or more user selectable links for one or more application states of a native application that is not available on the user device. For example, the application may not be available on the user device if the native application is not installed on the user device. In these examples, the user selectable links for the application states of the unavailable native application may indicate (e.g., using text and/or image data) to the user that the application is not available on the user device. As a result, the user device, and thus the user, may be unable to access the application states of the unavailable native application indicated by the user selectable links. In these examples, to access the application states, the user device may first download and install the native application on the user device. In other examples, the search results may reference only native applications that are available (e.g., installed) on the user device.

In the examples described above, the data included in the search results and the manner in which the search results are displayed to the user by the user device may vary depending on whether the search results include any user selectable links for application states of native applications that are not available on the user device. As one example, in the event the search results include a user selectable link for an application state of a native application that is not available on the user device, the search results may include an application download address (ADA) for the application. For example, the user device may generate a GUI element (e.g., a hyperlink) using (e.g., including) the ADA and display the GUI element within, or proximate to, the user selectable link for the application state of the unavailable native application. In this example, the search results may include data that describes the application state of the unavailable native application. Also in this example, the search results may not include data (e.g., instructions, or operations) that enables the user device to access the application state within the native application, since the application is not available on the user device.

As another example, in the event the search results include only user selectable links for application states of native applications that are available (e.g., installed) on the user device, the search results may not include any ADAs for native applications. In this example, the search results reference only native applications that are available on the user device. Instead, in this example, the search results may include data (e.g., instructions, or operations) that enables the user device to access application states within the native applications available on the user device. The native applications being set into the application states may result in the applications performing particular functions associated with the applications.

In the above-described examples, in cases where the search results reference a native application that is not available on the user device, an advertiser may wish to provide incentive to the user of the user device to render the application available on the user device. For example, the advertiser may generate an advertisement for the unavailable native application, or for an application state thereof, using an advertisement system, and transmit the advertisement to the user device to be displayed to the user along with the search results. In this example, the user device may display the advertisement within, or proximate to, a user selectable link for an application state of the unavailable native application. In this manner, the advertiser may entice the user to render the unavailable native application available on the user device, e.g., by downloading and installing the application on the user device. Upon rendering the unavailable native application available on the user device, the user device may launch the application and set the application into the application state indicated by the user selectable link. As a result, the user device can cause the now-available native application to perform a function associated with the application, as indicated by the user selectable link.

In some examples, the user device generates and transmits data that indicates one or more native applications that are available on the user device. For example, the user device may transmit the data to the search system and/or the advertisement system. Using the data, the search system and/or the advertisement system may determine whether the search results generated and transmitted by the search system to the user device include any user selectable links for application states of native applications that are not available on the user device. Based on the determination, the search system and/or the advertisement system may generate the advertisement described above and transmit it to the user device. In other examples, the user device may determine whether the search results received by the user device from the search system include any user selectable links for application states of native applications that are not available on the user device. Based on the determination, the user device may transmit a request for the advertisement described above to the search system and/or the advertisement system and receive the advertisement in response to the request.

The techniques of the present disclosure may enable advertisers of applications to effectively and efficiently advertise sponsored applications, or application states thereof. Using the techniques, the advertisers can automatically identify device users who do not use the sponsored applications based on search results that are responsive to the users' search queries, and provide advertisements for the applications, or application states thereof, to the users as part of the search results. As a result, the techniques can enable the advertisers to identify and advertise to device users who are more likely to install and use the sponsored applications, thereby enabling the advertisers to advertise effectively. Additionally, by enabling the advertisers to identify the device users automatically, the techniques can also enable the advertisers to advertise the sponsored applications, or application states thereof, efficiently.

FIG. 1 is a functional block diagram that illustrates an example environment that includes a search system 100 and an advertisement system 106 (hereinafter, "ad system 106") that communicate with one or more user device(s) 102, data source(s) 104, and advertiser device(s) 108 via a network 110. In the example environment of FIG. 1, the search system 100 and the ad system 106 also communicate with one another.

The search system 100 receives a search query from one of the user device(s) 102 and generates search results in response to the search query. The search system 100 then transmits the search results to the user device 102. Upon receiving the search results, the user device 102 displays the search results to a user of the user device 102. The search results include one or more application access mechanisms (AAMs), each of which may be rendered as a user selectable link, displayed to the user, and selected by the user via the user device 102. An AAM includes data that references a native application and indicates one or more operations for the application to perform. Stated another way, the AAM specifies the native application and indicates the operations for the application to perform. In response to the user selecting a user selectable link for an AAM included in the search results, the user device 102 launches a native application referenced by the AAM. The user device 102 also causes the native application to perform a function by performing one or more operations indicated by the AAM. As a result, the native application is configured, or set, into a particular application state that corresponds to the operations. For example, the native application may be set into a state in which the application displays one or more products, services, or vendors, to the user, e.g., via a display of the user device 102.

In this disclosure, an application may refer to computer software that causes a computing device (e.g., the user device 102) to perform a task. In some examples, an application is referred to as an "application," an "app," or a "program." Example applications include word processing applications, spreadsheet applications, messaging applications, media streaming applications, social networking applications, and games. Applications can be executed on a variety of different computing devices, including mobile computing devices, such as smart phones, tablets, and wearable computing devices (e.g., headsets and/or watches). Applications can also be executed on other types of computing devices having other form factors, such as laptop computers, desktop computers, or other consumer electronic devices. In some examples, applications are installed on a computing device prior to a user purchasing the device. In other examples, the user may download and install applications on the computing device.

The functionality of an application may be accessed on a computing device on which the application is installed, and/or via a remote computing device. In some examples, all of an application's functionality are included on a computing device on which the application is installed. In these examples, the application may function without communication with other computing devices. In other examples, an application installed on a computing device may access information from other remote computing devices during operation. For example, a weather application installed on a computing device may access the latest weather information via the Internet and display the information to a user. In still other examples, an application may be partially executed by a user's computing device and partially executed by a remote computing device. For example, a web-based application may be executed, at least in part, by a web server and accessed by a user via a web browser of the user's computing device. Example web-based applications include web-based email, online auctions, and online retail sites.

In this disclosure, a native application refers to an application that is installed on the user device 102. A native application, as described herein, can perform any of a variety of different functions for the user of the user device 102. As one example, a restaurant reservation application can make reservations for restaurants. As another example, an Internet media player application can stream media (e.g., a song or a movie) from the Internet to the user device 102. In some examples, a single native application can perform multiple functions. As one example, a restaurant reservation application can allow the user to retrieve information about a restaurant and read user reviews for the restaurant, in addition to making reservations for the restaurant. As another example, an Internet media player application can allow the user to perform searches for digital media and generate music playlists, in addition to streaming media from the Internet.

In this disclosure, an AAM refers to data used by the user device 102 to access the functionality provided by a native application. Specifically, the AAM includes data that specifies the native application. As a result, when the user selects a user selectable link for the AAM, the user device 102 launches the native application. The AAM also includes data that indicates one or more operations to be performed by the native application. As such, upon launching the native application using the AAM, the user device 102 also causes the application to perform the operations, thus causing the application to perform a function associated with the application. Performance of the operations may result in the native application being set into an application state. Thus, in response to selection of a user selectable link for an AAM, the user device 102 may launch a native application referenced by the AAM and set the application into an application state specified by the AAM.

As one example, an AAM for a native restaurant reservation application may include data that causes the user device 102 to launch the application and make a reservation at a restaurant using the application. Performance of operations included in the AAM may set the native application into an application state in which the application displays information related to the reservation. The information can include a reservation time, a description of the restaurant, user reviews, as well as any other information related to the reservation or the restaurant. As another example, an AAM for a native Internet media player application may include data that causes the user device 102 to launch the application and stream media (e.g., music) from the Internet to the user device 102 using the application. Performance of operations included in the AAM may set the native application into an application state in which the application displays to the user information regarding the media being streamed to the user device 102, such as a song name, an artist name, or an album name.

An application state of a native application specified by a corresponding AAM may depend on the functionality provided by the application. As one example, if the native application retrieves and displays information from the Internet, the application can be set into an application state in which the application retrieves information from the Internet and displays the information to a user. As another example, if the native application plays media (e.g., music and/or video) from the Internet, the application can be set into an application state in which the application plays a song or a movie from the Internet. As yet another example, if the native application makes restaurant reservations, the application can be set into an application state in which the application displays available restaurant reservations to the user.

AAMs may have various different formats and content. The format and content of an AAM may depend on the native application associated with the AAM and the one or more operations that are performed by the application based on the AAM. For example, an AAM for an Internet music player application may differ from an AAM for a shopping application. For instance, the AAM for the Internet music player application may include references to musical artists, songs, and albums. The AAM may also reference one or more operations, such as randomizing a list of songs and playing a song or an album. The AAM for the shopping application may include references to one or more products that are sold via the application. The AAM may also reference one or more operations, such as adding one or more products to a shopping cart and proceeding to a checkout.

The search system 100 transmits the search results including the one or more AAMs to the user device 102 along with additional data. For example, the search system 100 may transmit link data (e.g., text and/or image data) that the user device 102 may use to generate one or more user selectable links based on the search results. A user selectable link may include text and/or image(s) that a user may select (e.g., touch, or "click on"). Each user selectable link may be associated with an AAM, such that when the user selects a particular link, the user device 102 launches a native application specified by the corresponding AAM and causes the application to perform one or more operations indicated by the AAM. The text and/or image(s) of the user selectable link may indicate the operations that the native application performs in response to selection of the link. For example, if the user selectable link is for a song in a music player application, the text and/or image(s) may indicate that the user device 102 may launch the application, and that the application may play the song, when the user selects the link. Example user selectable links are shown in FIGS. 2, 10A, 11A-11C, and 12A.

A user may select a user selectable link to cause the user device 102 to launch a native application identified in the link and cause the application to perform one or more operations according to an AAM associated with the link. In other words, when the user selects the user selectable link, the user device 102 launches the native application and sets the application into an application state defined by the AAM. In this manner, the application state of the native application may refer to the one or more operations and/or the resulting outcome of the application performing the operations, in response to the user selecting the user selectable link.

The search system 100 includes an application data store 114 (hereinafter, "data store 114") that the search system 100 uses to generate the search results. The data store 114 may include one or more databases, indices (e.g., inverted indices), tables, files, or other data structures that may be used to implement the techniques of the present disclosure. In some examples, the data store 114 is included in one or more storage devices. The data store 114 includes one or more function records (e.g., the function record 152 of FIG. 3B). Each function record may include data related to a function of a native application and/or to an application state of the application resulting from the application performing the function. Each function record may include a function identifier (ID), one or more AAMs, and application state information (ASI), which are described in greater detail below.

A function ID of a function record may be a string that uniquely identifies the function record among other function records included in the data store 114. In some examples, the function ID describes a function and/or an application state associated with the function record in human readable form. For example, the function ID may be a string that describes a function performed by a native application according to an AAM of the function record and/or an application state of the application after it performs the function. For instance, a function ID of a function record for a song in an Internet music player application may include a name of the application and a name of the song that may be played when the application is set into an application state defined by an AAM of the function record.

An AAM of a function record includes data that causes the user device 102 to launch a native application and perform a function associated with the application. For example, the AAM may be a string that includes a reference to the native application and indicates one or more operations for the user device 102 to perform with respect to the application. The AAM may include an application resource identifier (ARI) that references the native application and/or specifies the operations. The ARI may be a string that has an application specific scheme. For example, the ARI may include a reference to the native application, a domain name, and a path for the application to retrieve and display information to the user.

In some examples, the AAM includes one or more operations for the user device 102 (e.g., the native application) to perform in addition to the operations indicated by the ARI. For example, a search application, an operating system (OS), and/or a native application available on the user device 102 may perform the additional operations. In some examples, the additional operations are included in a script. Examples of the additional operations include launching the native application, creating and sending a search request to an application server, setting a current geographic location in the application, making a restaurant reservation, sending a text message, and adding an appointment to a calendar.

In some examples, the AAM does not include an ARI. Instead, in these examples, the AAM may include data that references a native application and indicates one or more operations for the application to perform. In these examples, the operations indicated by the AAM may reference the native application. The operations may include instructions for at least one of the search application, the OS, and the native application. In these examples, in response to the user selecting a user selectable link for the AAM, the user device 102 may identify the native application referenced by the operations, launch the application, and cause it to perform the operations.

In some examples, a function record includes multiple different AAMs. For example, the AAMs may be associated with different editions of a native application. An edition of a native application refers to a particular implementation, or variation, of the application. For example, the edition may refer to a version of the native application, such as a version 1.0 or 2.0 of the application. In another example, the edition may refer to an implementation of the native application for a specific platform, such as a specific OS. The different AAMs included in the function record may cause the corresponding native application editions to launch and perform similar functions. Accordingly, the different AAMs may cause the corresponding native application editions to be set into similar application states. In one example, the different AAMs reference different editions of an information retrieval application and cause the corresponding native application editions to retrieve similar information. In another example, the different AAMs reference different editions of an Internet music player application and cause the corresponding native application editions to play the same song.

As a specific example, a function record for an application state of a native application that retrieves restaurant information may include multiple different AAMs for multiple different editions of the application. In this example, the function record is associated with a specific Mexican restaurant. The AAMs for the different native application editions may cause each edition to retrieve information for the same Mexican restaurant. For example, a first AAM may cause a first application edition (e.g., for a first OS) to retrieve information for the restaurant, and a second AAM may cause a second application edition (e.g., for a second OS) to retrieve information for the same restaurant.

As described herein, to generate the search results that include the one or more AAMs, the search system 100 may identify one or more function records included in the data store 114 and select the AAMs from the function records. In some examples, the search system 100 identifies one or more function records that each includes multiple AAMs. For each identified function record including multiple AAMs, the search system 100 may select some or all of the AAMs for transmission to the user device 102 as part of the search results. In some examples, the search system 100 transmits all AAMs of a function record to the user device 102 so that the user device 102 may determine which of the AAMs to use to access the application state associated with the function record. In other examples, the search system 100 may determine which of the AAMs to transmit to the user device 102 based on information included in a query wrapper received from the user device 102. For example, the information may indicate various properties of the user device 102, such as, e.g., the OS, or device type, of the user device 102. Using the information, the search system 100 may transmit one or more of the AAMs of the function record that are likely to be compatible with the user device 102.

In some examples, a function record includes a web access mechanism (WAM). The WAM may be a resource identifier that can be processed by a wide variety of user devices having different operating systems. In some examples, the WAM includes a uniform resource locator (URL) (i.e., a web address) used with the hypertext transfer protocol (HTTP). When included in a function record along with an AAM, the WAM may be used by a web browser of the user device 102 to access a web resource that includes similar information and/or performs a similar function as that of a native application set according to the AAM. In one example, the WAM may direct the web browser to a web-based version of the native application specified by the AAM. For example, if the AAM causes the native application to retrieve information for a specific Mexican restaurant, the WAM may direct the web browser to a web page entry for the Mexican restaurant, e.g., within a web-based version of the application. In other examples, a function record may include a WAM and not include any AAMs. In these examples, the function record may correspond to a function, or an application state, of a web-based application.

During some searches, the search system 100 may identify one or more function records that each includes one or more AAMs and/or WAMs. For each such function record, the search system 100 may determine whether to transmit the AAMs and/or WAMs of the function record to the user device 102. In some examples, the search system 100 transmits the AAMs and/or WAMs to the user device 102 so that the user device 102 can determine which of the access mechanisms to use to access an application state associated with the function record. In other examples, the search system 100 may determine whether to transmit any of the AAMs to the user device 102. If the search system 100 determines that none of the AAMs is likely to be compatible with the user device 102, the search system 100 can refrain from transmitting the AAMs, and may instead transmit the WAMs to the user device 102. As described above, the user device 102 may use the WAMs and a web browser to retrieve similar information and/or perform a similar function as that of a native application set according to the AAMs.

In examples where the search system 100 transmits one or more WAMs as part of the search results, the search system 100 may also transmit link data (e.g., text and/or image data) that may be used by the user device 102 to generate user selectable links for the WAMs. In response to a user of the user device 102 selecting a user selectable link for a WAM, the user device 102 may launch the web browser and perform the function indicated by the WAM.

ASI of a function record includes data that describes an application state into which a native application is set according to an AAM included in the function record. In some examples, the ASI includes data that describes a function performed according to the AAM of the function record. The ASI can include text, numbers, and/or symbols that describe the application state or function. The types of data included in the ASI may depend on the type of information associated with the application state and the function specified by the AAM.

In some examples, the ASI includes data that is presented to a user of the user device 102 when the native application is in the application state specified by the AAM. As one example, a function record for an application state of a shopping application may include ASI that describes products (e.g., names and prices) that are shown to the user when the application is set into an application state specified by an AAM of the function record. As another example, a function record for an application state of a music player application may include ASI that describes a song (e.g., name and artist) that is played when the application is set into an application state specified by an AAM of the function record.

ASI of a function record may be generated in a variety of different ways. For example, data to be included in the ASI may be retrieved via partnerships with database owners and developers of native applications. In one example, the data may be automatically retrieved from online databases that include information related to movies, television programs, music, and restaurants. In another example, at least some of the data may be manually generated by a human operator. In any case, in some examples, the data included in the ASI is updated over time so that the search system 100 provides up-to-date search results.

In some examples, a function record also includes a quality score. The quality score may be a number used by the search system 100 to generate a result score for the function record. For example, the quality score may be a function record scoring feature that is input into one or more machine-learned models used to generate the result score, as described below. The quality score may be determined based on metrics associated with a person, place, or thing described in the function record. For example, the quality score may be based on the popularity of a place described in the function record and/or ratings (e.g., user ratings) of the place. In another example, if the function record describes a song, the quality score may be based on the popularity of the song and/or ratings (e.g., user ratings) of the song. The quality score may also be determined based on measurements associated with the function record, e.g., based on data indicating how often the function record is retrieved during a search and how often a user selectable link generated for an AAM of the function record is selected by a user.

As described above, the search system 100 receives the search query from the user device 102 and generates the search results in response to the search query. The search query may include text, numbers, and/or symbols (e.g., punctuation) entered into the user device 102 by the user. For example, the user may have entered the search query into a search field, or "search box," of the search application executing on the user device 102. The user may have entered the search query using a touchscreen keypad, a mechanical keypad, and/or via speech recognition techniques. As described herein, in some examples, the search application is a native application dedicated to search, or a more general application, such as a web browser.

In some examples, the user device 102 transmits additional data to the search system 100 along with the search query. The search query and the additional data may be referred to as a query wrapper. The additional data may be associated with the search query and may include geo-location data for the user device 102, platform data for the user device 102 (e.g., a type and/or a version of the user device 102, the OS, and/or the web browser), an identity of the user (e.g., a username), partner specific data, and other data. The user device 102 transmits the query wrapper to the search system 100. The search system 100 uses the search query and/or the additional data included in the query wrapper to generate the search results.

The search system 100 also includes a search module 112 that generates the search results based on the search query. The search results include one or more AAMs selected from one or more function records included in the data store 114. Initially, the search module 112 analyzes the search query received from the user device 102. The search module 112 then identifies a set of function records in the data store 114 based on the analyzed search query. For example, the search module 112 may identify the set of function records based on matches (e.g., text matches) between terms of the search query and terms of ASI included in the identified function records.

The search module 112 processes (e.g., scores) the identified set of function records. For example, the search module 112 may determine how well the function records match the search query. The search module 112 may then select one or more AAMs from the function records that best match the search query. The search system 100 transmits the search results including the selected AAMs to the user device 102. The search system 100 may also transmit additional data along with the AAMs. For example, the search system 100 may transmit link data (e.g., text and/or image data) used to generate user selectable links for the AAMs. In some examples, the search module 112 generates result scores for the selected AAMs. Each AAM may be associated with a result score that indicates the rank of the AAM relative to the other AAMs. The search system 100 may transmit the result scores to the user device 102 along with the selected AAMs included in the search results.

The ad system 106 uses the search results generated by the search system 100 (i.e., the search module 112) to generate one or more advertisements to be displayed to the user of the user device 102. An advertisement generation module 118 (hereinafter, "ad generation module 118") included in the ad system 106 generates an advertisement for a native application that is not available on the user device 102, or for an application state thereof, when an AAM that specifies the application is included in the search results. In one example, the search system 100 and/or the user device 102 may determine that the search results include the AAM that specifies the unavailable native application and provide an indication of this determination to the ad system 106. The ad generation module 118 may generate the advertisement based on the indication. In another example, the ad generation module 118 may determine that the search results include the AAM that specifies the unavailable native application and generate the advertisement without interacting with the search system 100 and/or the user device 102.

The ad system 106 transmits the advertisement to the user device 102, e.g., directly, via the search system 100, or indirectly via another system or device. The user device 102 displays the advertisement to the user along with a user selectable link for the AAM that specifies the unavailable native application. The user selectable link may include an ADA for the unavailable native application. The advertisement may include information that specifies or otherwise indicates one or more discounts or promotions related to a product, service, or vendor associated with an application state specified by the AAM, or with the unavailable native application itself.

The ad system 106 includes an advertisement data store 120 (hereinafter, "data store 120") that the ad system 106 may use to generate advertisements. In some examples, the data store 120 is included in one or more storage devices.

The data store 120 includes data associated with one or more advertisements. The data associated with an advertisement may be referred to as an "advertisement record," or an "ad record" (e.g., the ad record 174 of FIG. 4B). The data store 120 may include one or more ad records that each includes data for a different advertisement. The ad records may be generated using the advertiser device(s) 108 and a record generation module 116 included in the ad system 106. The ad records may be generated by advertisers, by advertisement agencies, or by providers of any of the application search and advertisement generation functionalities described above.

An ad record may include a variety of different types of data related to an advertisement. For example, the ad record may include data that identifies the ad record, such as an advertisement record name and/or ID that identifies the ad record among other ad records included in the data store 120. The ad record may also include a sponsored function name and/or ID that identifies a sponsored function associated with the ad record. The sponsored function may be an application state of a native application for which an advertiser has paid to have an advertisement displayed to a user. For example, the advertiser may pay to have the advertisement generated, transmitted, and displayed to the user when the sponsored function is referenced (e.g., via an AAM) in the search results and when the corresponding native application is not available on the user device 102. In some examples, the advertisement includes an ADA for the native application. The ad record may also include advertisement content (hereinafter, "ad content") used to generate the advertisement for the sponsored function. The ad content may include text, images, and/or video data associated with the sponsored function.

The ad record may also include advertisement parameters (hereinafter, "ad parameters"), which may define one or more budgets associated with advertising the sponsored function. The ad parameters may also define timing parameters associated with advertising the sponsored function, such as start and stop dates for advertising the function and/or time(s) of day during which the function is to be advertised. Additionally, the ad parameters may specify user and/or platform parameters associated with advertising the sponsored function, such as one or more user, device, and/or platform (e.g., OS) types for which the function is to be advertised.

Generating advertisements in this manner may provide a number of value propositions to an advertiser of applications. For example, the user of the user device 102 may be more likely to download and install a native application that is referenced by the search results that are responsive to the user's search query because the application, or an application state thereof, may be relevant to the user. As such, the advertiser providing an advertisement for the native application, or for the application state thereof, may prove to be more effective than providing the advertisement in another setting (e.g., by targeting device users using other parameters). Moreover, because the advertiser may automatically identify users that do not have the native application available on their user devices, the advertiser may avoid spending time, effort, and resources to manually identify the users or generate the advertisements.

The user device(s) 102 can be any computing devices capable of providing search queries to the search system 100 and receiving search results and advertisements from one or more of the search system 100 and the ad system 106. The user device(s) 102 may include smart phones, tablet computers, laptop computers, and desktop computers, as some examples. The user device(s) 102 may also include other computing devices having other form factors, such as computing devices included in vehicles, gaming devices, televisions, or other appliances (e.g., networked home automation devices and home appliances).

The user device(s) 102 may use a variety of different operating systems. In an example where a user device 102 is a mobile device, the user device 102 may operate using an OS, such as ANDROID® developed by Google Inc., IOS® developed by Apple Inc., or WINDOWS PHONE® developed by Microsoft Corporation. In an example where the user device 102 is a laptop or desktop computing device, the user device 102 may use an OS, such as MICROSOFT WINDOWS® developed by Microsoft Corporation, MAC OS® developed by Apple Inc., or LINUX® (LINUX® is the registered trademark of Linus Torvalds in the U.S. and other countries). The user device(s) 102 may also interact with one or more of the search system 100 and the ad system 106 using operating systems other than those described above, whether presently available or developed in the future.

The user device(s) 102 can communicate with the search system 100 and/or the ad system 106 via the network 110. In general, a user device 102 may communicate with any of the systems 100, 106 using any application that can transmit search queries to the search system 100 and receive search results and advertisements from the search system 100 and/or the ad system 106. In some examples, the user device 102 executes an application that is dedicated to interfacing with one or more of the systems 100, 106, such as an application dedicated to searches (e.g., a search application). In other examples, the user device 102 may communicate with any of the systems 100, 106 using a more general application, such as a web browser. In any case, an application executed by the user device 102 to communicate with one or more of the systems 100, 106 may include a GUI with a search field, or search box, into which the user of the user device 102 may enter search queries, e.g., using a touchscreen, physical keyboard, a speech-to-text program, or other form of user input available on the user device 102.

The user device 102 may use a GUI of a search application, or a more general application, executing on the user device 102 to display the search results received from the search system 100 to the user. The user device 102 may also use the GUI to receive the search query from the user and to transmit the search query to the search system 100, as described above. The GUI may display the search results to the user in a variety of different ways, depending on the information transmitted to the user device 102 from the search system 100. In examples where the search results include one or more AAMs, the search system 100 may transmit the AAMs to the user device 102 along with link data used to generate one or more user selectable links for the AAMs. In some examples, the GUI displays the search results to the user as a list of the generated user selectable links, including text and/or image(s). For example, the text and/or images(s) may include names of native applications specified by the AAMs, descriptions of the AAMs and/or operations indicated therein, and images associated with the applications, or application states thereof, referenced by the AAMs (e.g., application or application state icons, or "screens"). In some examples, the GUI displays the search results as a list of the generated user selectable links arranged under a search field into which the user has entered the search query. The GUI may arrange the generated user selectable links by result scores associated with the links, i.e., associated with the AAMs for which the links are generated. In some examples, the GUI also groups user selectable links for the same native application.

In some examples, the user device(s) 102 communicates with the search system 100 via a partner computing system (not shown). The partner computing system may be a computing system of a third party that may leverage the search functionality of the search system 100. The partner computing system may belong to a company or organization other than that which operates the search system 100. Example third parties, which may leverage the functionality of the search system 100 may include Internet search providers and wireless communications service providers. The user device(s) 102 may send search queries to the search system 100 and receive search results via the partner computing system. The partner computing system provides a user interface to the user device(s) 102 in some examples and/or modifies the search experience provided on the user device(s) 102.

The data source(s) 104 may be sources of data which the search system 100 may use to generate and/or update the data store 114. For example, the search system 100 may use the data source(s) 104 to generate and/or update one or more databases, indices, tables, files, or other data structures included in the data store 114. The search system 100 may generate new function records and update existing function records based on data retrieved from the data source(s) 104. Although not shown in FIG. 1, the search system 100 may include modules that generate new function records and/or update existing function records based on the data retrieved from the data source(s) 104. In some examples, some of the data included in the data store 114 (e.g., one or more function records) is manually generated by a human operator.

The data source(s) 104 may include a variety of different data providers. For example, the data source(s) 104 may include data from application developers, such as application developer websites and data feeds provided by application developers. The data source(s) 104 may also include operators of digital distribution platforms configured to distribute applications to the user device(s) 102. The data source(s) 104 may further include other websites, such as websites that include web logs (i.e., blogs), application reviews, or other data related to applications. Additionally, the data source(s) 104 may include social networking sites, such as "FACEBOOK®" by Facebook Inc. (e.g., Facebook posts) and "TWITTER®" by Twitter Inc. (e.g., text from tweets). The data source(s) 104 may also include online databases that include data related to movies, television programs, music, and restaurants. The data source(s) 104 may include other types of data sources in addition to the ones described above, any of which may have various types of content and update rates.

The search system 100 may retrieve data from the data source(s) 104, including any type of data related to application functionality and/or states. The search system 100 may then generate one or more function records stored in the data store 114 based on the data. In other examples, some of the data included in the function records (e.g., ASI) may be manually generated by a human operator. In any case, the data included in the function records may be updated over time so that the search system 100 provides up-to-date search results.

As described above, the user device(s) 102, advertiser device(s) 108, search system 100, ad system 106, and data source(s) 104 may communicate with one another via the network 110. The network 110 may include various types of networks, such as a wide area network (WAN) and/or the Internet. Although the network 110 may represent a long range network (e.g., the Internet or WAN), in some examples, the network 110 includes a shorter range network, such as a local area network (LAN). In one example, the network 110 uses standard communications technologies and/or protocols. Thus, the network 110 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the HTTP, the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of the data can be encrypted using conventional encryption technologies, such as secure sockets layer (SSL), transport layer security (TLS), virtual private networks (VPNs), Internet Protocol security (IPsec), etc. In other examples, the network 110 can use custom and/or dedicated data communications technologies instead of, or in addition to, the ones described herein.

Figure 2:
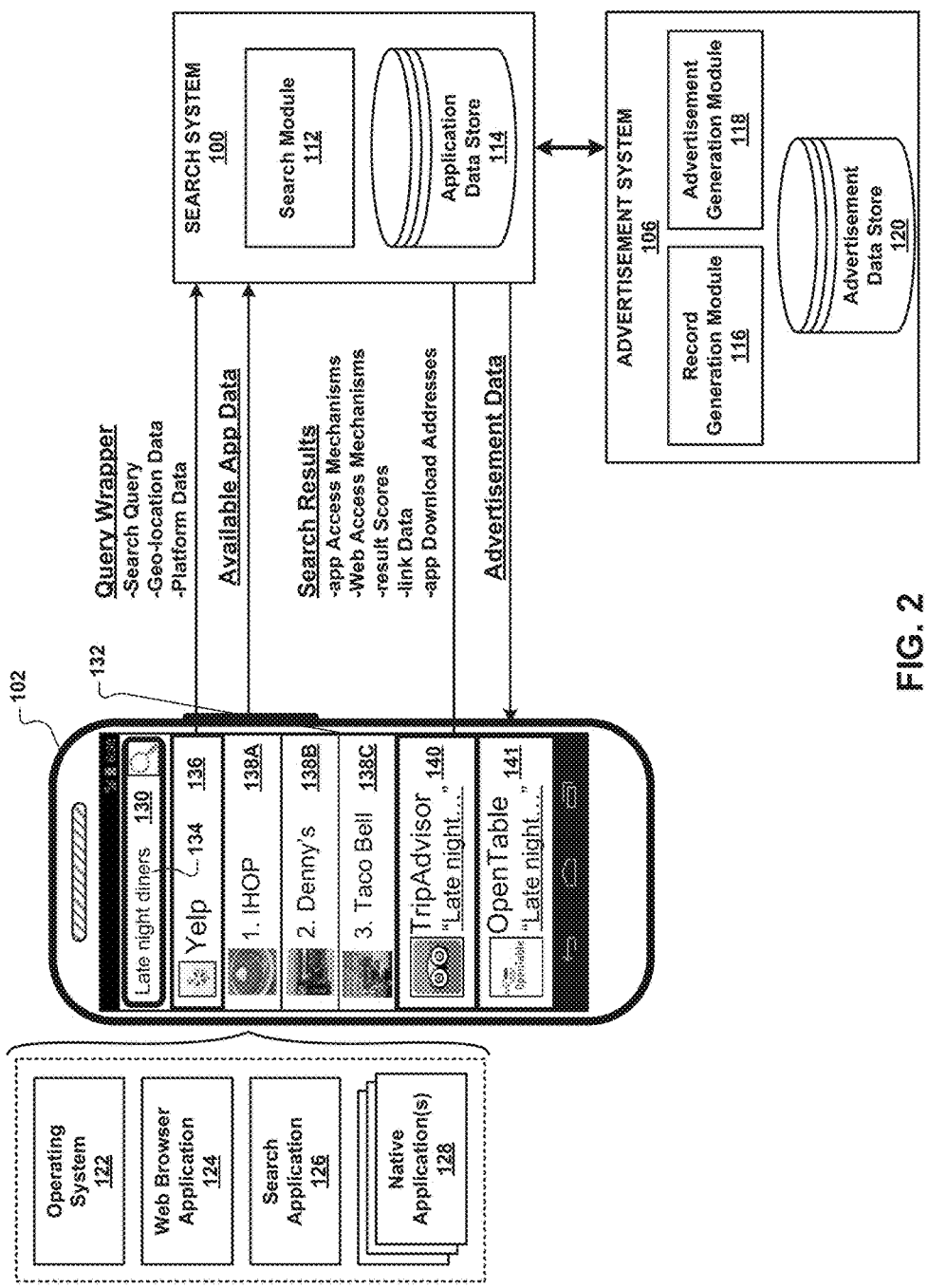
FIG. 2 depicts an example of a user device in communication with a search system and an advertisement system.

FIG. 2 illustrates an example of one of the user device(s) 102 in communication with the search system 100 and the ad system 106. In FIG. 2, the user device 102 displays search results received by the user device 102 from the search system 100 in the form of user selectable links 136, 138A-138C, 140, and 141 (collectively, the "links"). Each of the links includes link data. Specifically, each link includes text (e.g., a name of an application, or an application state) and an image (e.g., an icon for the application, or application state) that describe the application, or application state, associated with the link. As one example, the links 138A-138C describe the application states, or entries, for "IHOP," "Denny's," and "Taco Bell," respectively, within the native application "YELP®" by Yelp Inc. (hereinafter, "Yelp").

Each link may be associated with an AAM or a WAM received in the search results, such that when a user of the user device 102 selects the link, the user device 102 launches the corresponding native or web-based application and sets it into an application state specified by the AAM or WAM. As described below, the links may be arranged for display to the user based on result scores generated for function records that include the AAMs or WAMs associated with the links. Additionally, as shown in FIG. 2, links for the same application (e.g., Yelp) may be displayed together, or grouped, in the search results displayed to the user.

As shown in FIG. 2, the user device 102 transmits the query wrapper to the search system 100. The query wrapper may include a search query 134, geo-location data, platform data, and/or other data associated with the user, the user device 102, and/or the search query 134. In this example, the user may have entered the search query 134 into a search field 130 of a GUI of a search application 126 executing on the user device 102 and submitted the search query 134 using a search button 132 of the GUI. As also shown, the user device 102 may also transmit available application data (e.g., "device application information") that indicates one or more native applications that are available on the user device 102 to the search system 100 and/or the ad system 106. As shown in FIG. 2, in response to the query wrapper, the search system 100 transmits search results to the user device 102, which may include one or more AAMs, WAMs, result scores, link data, and ADAs. As also shown, one or more of the systems 100, 106 transmit to the user device 102 an advertisement for a native application referenced by the search results that is not available on the user device 102, or for an application state thereof. The ad system 106 may generate the advertisement when one or more of the systems 100, 106 determines that the native application referenced by the search results is not available on the user device 102, e.g., using the available application data, or based on a request received from the user device 102.

As also shown in FIG. 2, the user device 102 includes an OS 122, a web browser application 124, the search application 126, and one or more native application(s) 128. In this example, the search application 126 may display the links to the user via a GUI of the search application 126, as depicted in FIG. 2. The user device 102 may use the web browser application 124 to access application states of web-based applications, e.g., using WAMs received as part of the search results via the search application 126 and/or the web browser application 124. The OS 122 may generally provide some or all of the functionality attributed to the user device 102 in this disclosure. The native application(s) 128, in turn, may include various applications installed on the user device 102, e.g., Yelp, "TRIPADVISOR®" by TripAdvisor LLC, or "URBANSPOON®" by Wanderspot LLC (hereinafter, "TripAdvisor" and "Urbanspoon"), as some examples.

Figure 3A:
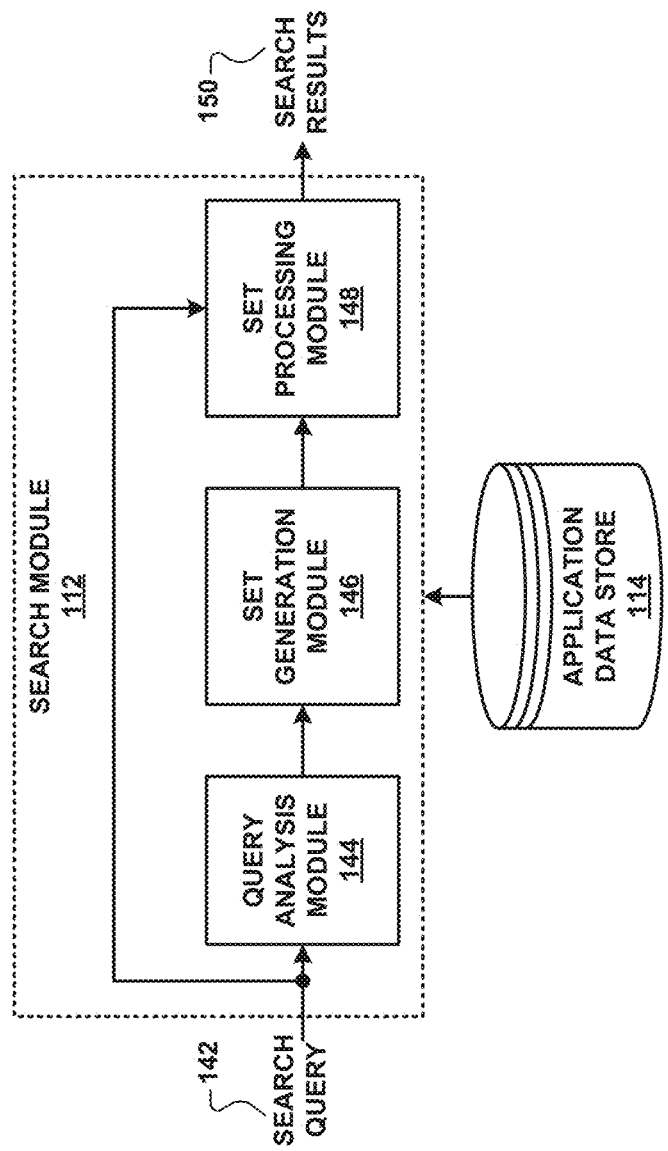
FIG. 3A is a functional block diagram of an example search module of a search system.

FIG. 3A illustrates an example search module 112 that may be included in the search system 100. The search module 112 includes a query analysis module 144, a consideration set generation module 146 (hereinafter "set generation module 146"), and a consideration set processing module 148 (hereinafter "set processing module 148"). The query analysis module 144 receives a query wrapper that includes a search query 142. The query analysis module 144 analyzes the received search query 142. For example, the query analysis module 144 may perform various analysis operations on the search query 142. Example analysis operations performed by the query analysis module 144 with respect to the search query 142 may include tokenization, filtering, stemming, synonymization, and stop word removal.

The set generation module 146 identifies a set of one or more function records included in the data store 114 based on the analyzed search query 142. The identified set of function records may be referred to herein as a "consideration set." In some examples, the set generation module 146 identifies the function records of the consideration set based on one or more matches between one or more terms of the search query 142 and one or more terms in the function records. For example, the set generation module 146 may identify the function records based on matches between tokens generated by the query analysis module 144 and words included in the function records, e.g., words in the ASI and/or function IDs of the function records.

The set processing module 148 processes the consideration set to generate search results 150 that include one or more AAMs selected from the one or more function records of the consideration set. In some examples, the set processing module 148 scores the function records of the consideration set. The scores associated with the function records may be referred to as "result scores." Accordingly, in some examples, each function record in the consideration set has a corresponding result score, which may be included in the search results 150.

The set processing module 148 may generate result scores for function records in a variety of different ways. In some examples, the set processing module 148 generates a result score for a function record based on one or more scoring features. The scoring features may be associated with the function record and/or the search query 142 that resulted in identification of the function record by the set generation module 146. A scoring feature for the function record ("record scoring feature") may be based on any data associated with the function record, e.g., data included in ASI of the function record. Example record scoring features for the function record include a quality score, whether the function record includes an AAM that specifies a default (e.g., main) application state or a deeper application state of a native application, as well as any number of other data specific to the function record. A scoring feature for the search query 142 ("query scoring feature") may include any data associated with the search query 142. Example query scoring features for the search query 142 include a number of words in the search query 142, the popularity of the search query 142, and an expected frequency of the words in the search query 142. Additionally, a scoring feature for the function record and the search query 142 ("record-query scoring feature") may include any data that may be generated based on data associated with both the function record and the search query 142. Example record-query scoring features for the function record and the search query 142 include parameters that indicate how well terms of the search query 142 match terms of the ASI and/or the function ID of the function record. The set processing module 148 may generate the result score for the function record based on one or more of a record scoring feature, a query scoring feature, and a record-query scoring feature for the function record and/or the search query 142.

The set processing module 148 may determine result scores for function records in the consideration set based on one or more of the scoring features described above and/or any additional scoring features not explicitly listed. In some examples, the set processing module 148 includes one or more machine-learned models (e.g., a supervised learning model) configured to receive one or more scoring features. The one or more machine-learned models may generate the result scores for the function records based on one or more of the record scoring features, the query scoring features, and the record-query scoring features described above. For example, the set processing module 148 may pair the search query 142 with each function record in the consideration set and compute a vector of features for each (query, record) pair. The vector of features may include one or more record scoring features, one or more query scoring features, and one or more record-query scoring features. The set processing module 148 may then input the vector of features into a machine-learned regression model to calculate a result score for the corresponding function record. In some examples, the machine-learned regression model includes a set of decision trees (e.g., gradient boosted decision trees). In other examples, the machine-learned regression model may include a logistic probability formula. In some examples, the machine-learned task described above can be framed as a semi-supervised learning task, where a minority of training data used to create the machine-learned regression model is labeled with human curated result scores and the rest of the training data is used without human curated result score labels.

The set processing module 148 may select one or more function records from the consideration set based on the result scores associated with the function records. For example, the set processing module 148 may select one or more function records having the highest one or more result scores from the consideration set. The set processing module 148 then selects one or more AAMs from the selected function records (e.g., from one or more highest-scoring function records). The set processing module 148 transmits the selected AAMs to the user device 102 that generated the search query 142. In some examples, the set processing module 148 transmits the result scores associated with the selected AAMs. For example, an AAM may be associated with a result score of a function record from which the AAM was selected.

The result scores associated with the AAMs may be used in a variety of different ways. In some examples, the result scores are used to rank the AAMs within a list for display to a user of the user device 102. In these examples, a larger result score may indicate that the corresponding AAM (e.g., an application state) is more relevant to the user's search query 142 than an AAM having a smaller result score. In examples where the search results 150 are displayed to the user as a list of user selectable links ("links"), links for AAMs associated with larger result scores may be listed higher within the list (e.g., near the top of a screen) than links for AAMs associated with lower results scores. In these examples, links for AAMs having lower result scores may be located farther down the list (e.g., off screen) and may be accessed by scrolling down a screen of the user device 102. In some examples, as shown in FIGS. 2, 10A, 11A-11C, and 12A, the user device 102 groups links associated with the same application as part of displaying the links to the user.

Generally speaking, the information conveyed by the search results 150 may depend on how the result scores are calculated for the function records of the consideration set by the set processing module 148. For example, the result scores may indicate the relevance of a particular application state specified by a function record of the consideration set to the search query 142, the popularity of the application state, or other properties of the application state, depending on which parameters the set processing module 148 uses to score the function records of the consideration set.

Figure 3C:
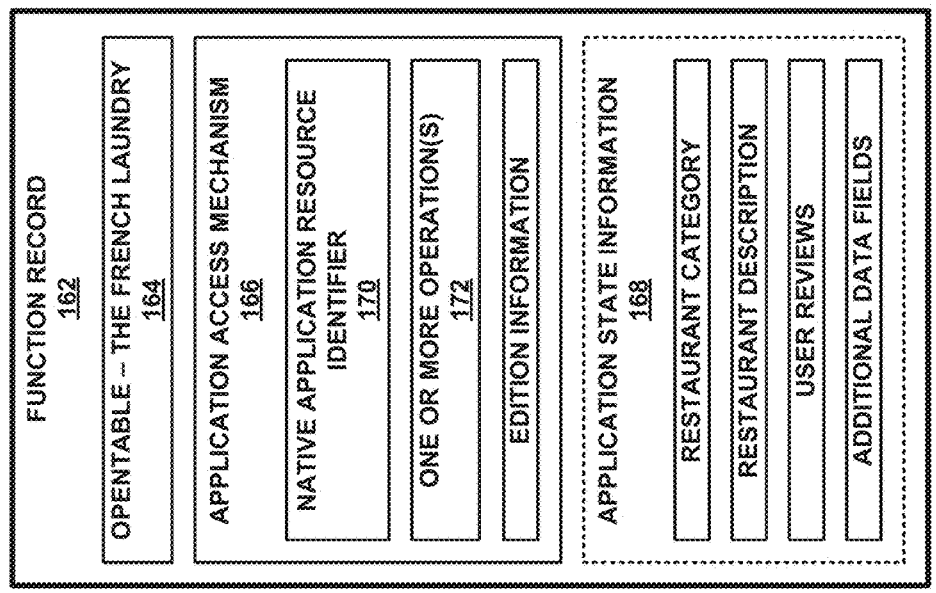
FIGS. 3B and 3C depict example function records included in an application data store of a search system.
Figure 3B:
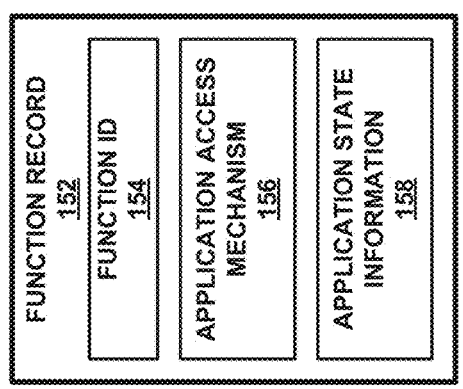

FIG. 3B illustrates an example function record 152 that may be included in the data store 114. The function record 152 includes a function ID 154, an AAM 156, and ASI 158. The function record 152 may include data related to a function of a native application. For example, the function record 152 may include data related to an application state of the native application that corresponds to, or results from, the application performing the function. The data store 114 may include one or more other function records each having a similar structure as that of the function record 152. In other words, the data store 114 may include one or more other function records each having a function ID, an AAM, and ASI.

The function ID 154 may be used to identify the function record 152 among other function records included in the data store 114. The function ID 154 may be a string of alphabetic, numeric, and/or symbolic characters (e.g., punctuation marks) that uniquely identify the function record 152. In some examples, the function ID 154 describes a function and/or an application state of a native application in human readable form. For example, the function ID 154 may include a name of a native application specified by the AAM 156 of the function record 152. Additionally, or alternatively, the function ID 154 may include a human readable string that describes a function performed by the native application according to the AAM 156 and/or an application state resulting from performance of the function. In some examples, the function ID 154 includes a string in the format of a uniform resource locator (URL) of a WAM, which may uniquely identify the function record 152. In these examples, the WAM may specify the same or similar application state as the AAM 156, but within a web-based version of the native application. In some examples, the WAM is included in the function record 152 (e.g., along with the AAM 156).

In one example, the function record 152 describes a function of Yelp. In this example, the function ID 154 may include the name "Yelp" along with a description of an application state within Yelp, e.g., as specified by the ASI 158. In another example, the function ID 154 describes a function of Yelp that corresponds to an entry for the restaurant "The French Laundry®" (hereinafter, "The French Laundry"). In this example, the function ID 154 may be "Yelp—The French Laundry." Alternatively, in the event the function ID 154 includes a string in the format of a URL, the function ID 154 may include the string "www.yelp.com/biz/the-french-laundry-yountville-2?ob=1" that uniquely identifies the function record 152.

The AAM 156 may include an ARI for the native application specified by the AAM 156 and/or one or more operations for a user device 102 to perform with respect to the application. For example, the ARI may be a string with an application specific scheme. As one example, the ARI may include a reference to the native application, a domain name, and a path to be used by the application to retrieve and display information to the user.

An example ARI for an application state of a native application "OPENTABLE®" by OpenTable Inc. (hereinafter, "OpenTable") for the Android® OS is "vnd.opentable.deeplink://opentable.com/restaurantprofile?rid=88333&refid=1." A portion of the example ARI references OpenTable. Specifically, the substring "vnd.opentable.deeplink" of the ARI references OpenTable. The ARI also indicates one or more operations for OpenTable to perform. For example, OpenTable may retrieve and display the information included in the ARI domain and path defined by the substring "opentable.com/restaurant/profile?rid=88333&refid=1." In this example, in response to selection of a user selectable link for an AAM that includes the ARI, the user device 102 may launch OpenTable and display information retrieved from the location indicated by the ARI. The ARI may be provided by an application developer.

In some examples, the AAM 156 includes one or more operations for the user device 102 to perform with respect to the native application (e.g., any one of the native application(s) 128) specified by the AAM 156 in addition to the operations indicated by the ARI. For example, the OS 122, the search application 126, and/or the native application may perform the additional operations to set the application into an application state specified by the AAM 156. In some examples, the operations are included in a script. Examples of the operations may include launching the native application, waiting for the application to start, creating and sending a search request to a server, setting a current geo-location for the application, making a restaurant reservation, sending a text message, and adding an appointment to a calendar.

In some examples, the AAM 156 is not include an ARI. Instead, in these examples, the AAM 156 may include one or more operations that reference the native application (e.g., any one of the native application(s) 128). The operations may be performed by the user device 102 and may include instructions for at least one of the OS 122, the search application 126, and the native application. In these examples, in response to selection of a user selectable link for the AAM 156, the user device 102 may perform the operations, which may be included in a script.

The AAM 156 may also include edition information that indicates an edition of the native application specified by the AAM 156. In other words, the edition information may identify the edition of the native application with which the one or more operations indicated by the AAM 156 are compatible. For example, the edition information may indicate the OS with which the AAM 156 is compatible. In some examples, the search system 100 can determine whether to transmit the AAM 156 in the search results 150 based on whether the user device 102 (e.g., the OS 122) can execute the AAM 156 (i.e., the native application and the one or more operations specified therein).

In some examples, an ARI of the AAM 156 is an application specific resource identifier that is defined by a developer of the native application specified by the AAM 156. In these examples, the search application 126 may receive the ARI and the OS 122 may send the ARI to the native application referenced by the ARI. As a result, the user device 102 may launch the native application and set it into the application state specified by the ARI.

In some examples, an application state of a native application may not be accessible using an ARI. As one example, the application state may not include a corresponding ARI that the user device 102 can use to access the application state using the native application. As another example, the native application may not be configured to receive ARIs. In these examples, an AAM (e.g., the AAM 156) for the native application can include one or more operations that set the application into the application state that may not otherwise be accessible using an ARI. For example, the search application 126 may receive the operations and execute the operations to set the native application into the corresponding application state. In a specific example, the operations may include launching the native application, as well as additional operations for the application to perform. For example, the search application 126 may initially trigger the native application to launch the application, and then wait for a period of time for the application to launch, or start. Subsequently, the search application 126 may perform one or more additional operations indicated by the AAM with respect to the native application, such as issuing a search instruction to the application.

In other examples, the native application may be configured to directly receive the operations indicated by the AAM. For example, the search system 100 may transmit the AAM to the user device 102 as part of the search results 150. In these examples, the native application may be launched according to the AAM, after which the application may perform the one or more operations received in the search results 150.

A single native application can provide different functionalities. For example, a restaurant reservation application can access reviews for a variety of different restaurants and set up reservations at the restaurants. Similarly, a travel application can book hotels, book flights, and provide reviews for different travel destinations. The different functionalities associated with a single native application may be accessed using different AAMs. For example, with respect to the restaurant reservation application, the data store 114 may include function records having different AAMs for accessing different restaurant reviews and setting up reservations. Similarly, the data store 114 may include function records having different AAMs for booking hotels, booking flights, and accessing reviews for different travel destinations.

In general, the ASI 158 may include data that describes the application state into which the native application specified by the AAM 156 is set according to the one or more operations indicated by the AAM 156. Additionally, or alternatively, the ASI 158 may include data that describes the function performed by the native application according to the AAM 156. The ASI 158 may include different types of data. For example, the ASI 158 may include structured, semi-structured, and/or unstructured data. The ASI 158 may be extracted or inferred from documents retrieved from the data source(s) 104. In some examples, the ASI 158 includes data that is manually generated. The ASI 158 may be periodically updated, so that up-to-date search results 150 can be provided in response to the user's search query 142.

In some examples, the ASI 158 includes data that may be presented to the user when the native application specified by the AAM 156 is in the application state defined by the AAM 156. For example, the ASI 158 may include data that describes the application state of the native application after the user device 102 has performed the one or more operations indicated by the AAM 156. In one example, if the function record 152 is associated with a shopping application, the ASI 158 may include data that describes a product (e.g., a name and a price) that is shown when the application is set into the application state defined by the AAM 156. In another example, if the function record 152 is associated with a music player application, the ASI 158 may include data that describes a song (e.g., a name and an artist) that is played when the application is set into the application state defined by the AAM 156.

The types of data included in the ASI 158 may depend on the type of information associated with the application state and the functionality defined by the AAM 156. In one example, if the function record 152 is for a native application that provides reviews of restaurants, the ASI 158 may include information (e.g., text and numbers) related to a restaurant, such as a category of the restaurant, reviews of the restaurant, and a menu for the restaurant. In this example, the AAM 156 may cause the user device 102 to launch the native application and retrieve information for the restaurant using the application. As another example, if the function record 152 is for a native application that plays music, the ASI 158 may include information related to a song, such as the name of the song, the artist, lyrics, and listener reviews. In this example, the AAM 156 may cause the user device 102 to launch the native application and play the song described in the ASI 158 using the application.

The AAMs for a single native application may vary in complexity. In some examples, the AAMs may cause the application to launch and perform additional operations after launching, as described above. In other examples, the AAMs may cause the application to launch into a default application state (e.g., a main application state, or a default homepage) without performing any additional operations. A function record that includes an AAM that causes a native application to launch into a default application state may be thought of as an AAM that specifies the application itself, rather than any particular application state that may be accessed through the application. A function record including such an AAM may include ASI describing the native application, rather than any particular application state. For example, the ASI 158 of the function record 152 may include a name of a developer of the native application specified by the AAM 156, a publisher of the application, a category (e.g., genre) of the application, a description of the application (e.g., a developer's description), and a price of the application. The ASI 158 may also include security or privacy data about the native application, battery usage of the application, and bandwidth usage of the application. The ASI 158 may also include application statistics. The application statistics may refer to numerical data related to the native application. For example, the application statistics may include a number of downloads, a download rate (e.g., downloads per month), a number of ratings, and a number of reviews.

FIG. 3C illustrates an example function record 162 for an application state of OpenTable. OpenTable is a restaurant reservation application that allows users to search for restaurants and make restaurant reservations. OpenTable also provides information about restaurants, including descriptions of restaurants and user reviews for the restaurants. The function record 162 of FIG. 3C describes an application state of OpenTable in which OpenTable provides information for the restaurant The French Laundry. In other words, the function record 162 describes an entry in OpenTable for The French Laundry.

The function record 162 includes a function ID "OpenTable—The French Laundry" 164, which may be used as a unique identifier to identify the function record 162 among other function records included in the data store 114. In other examples, the function ID 164 may include a URL that serves as the unique identifier for the function record 162. For example, the function ID 164 may include the string "http://www.opentable.com/the-french-laundry" as the unique identifier for the function record 162. In this example, a WAM of the function record 162 is used as the function ID 164 of the function record 162. In some examples, the user device 102 can use the WAM to access the entry for The French Laundry in a web-based version of OpenTable, as described above. In other examples, the function ID 164 may be a string of one or more characters, numbers, or symbols that are not in human readable form.

The function record 162 also includes an AAM 166. As shown in FIG. 3C, the AAM 166 includes a reference to OpenTable in the form of a native ARI 170. In other words, the AAM 166 specifies OpenTable using the native ARI 170. As also shown in FIG. 3C, the AAM 166 includes one or more operations 172 to be performed by OpenTable. In some examples, the operation(s) 172 is included in, or defined by, the native ARI 170. For example, the native ARI 170 may be "vnd.opentable.deeplink://opentable.com/restaurant/profile?rid=1180&refid=1." Using the native ARI 170 and/or the operation(s) 172, the user device 102 may access the application state, or entry, for The French Laundry in OpenTable. As also shown, the function record 162 includes edition information that may indicate an edition of OpenTable associated with the function record 162. In other words, the function record 162 may describe an entry for The French Laundry in a particular edition of OpenTable.

The function record 162 also includes ASI 168. As shown in FIG. 3C, the ASI 168 includes data fields for a restaurant category, a restaurant description, user reviews, and additional data relating to The French Laundry. In this example, the data field for the restaurant category may include the text "French cuisine" or "contemporary." The data field for the restaurant description may include text that describes The French Laundry. The data field for the user reviews may include text of user reviews for The French Laundry. The data field for the additional data may include additional data for The French Laundry that may not be applicable to the other data fields, such as, e.g., a menu, prices, and operating hours for The French Laundry.

Figure 4A:
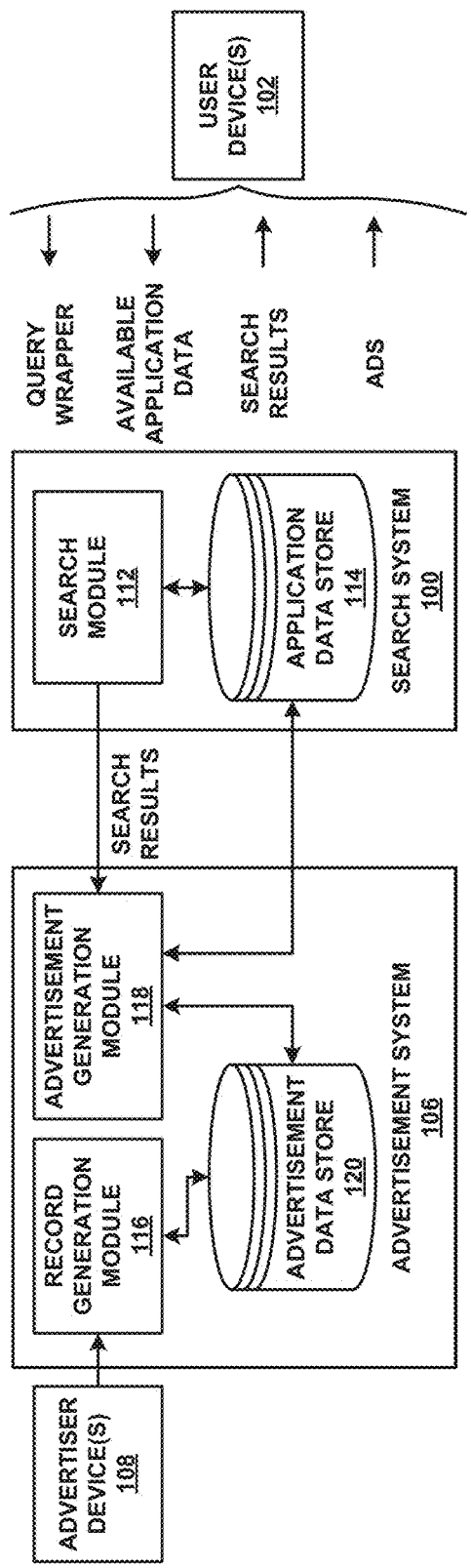
FIG. 4A is a functional block diagram of an example advertisement system in communication with a search system.

FIG. 4A is a functional block diagram that illustrates example interactions between one of the user device(s) 102, the search system 100, and the ad system 106. The functional block diagram of FIG. 4A also shows examples interactions between the advertiser device(s) 108 and the ad system 106. As described above, the user device 102 transmits a query wrapper that includes a search query to the search module 112. The search module 112 generates search results using the search query and the data store 114 and transmits the search results to the user device 102. The user device 102 displays the search results. As described above, the ad system 106 generates an advertisement for a native application (or application state) referenced by the search results that is not available on the user device 102. The ad system 106 and/or the search system 100 transmit the generated advertisement to the user device 102. The user device 102 displays the advertisement to the user along with the search results.

To generate the advertisement, the ad generation module 118 receives one or more of the query wrapper (including the search query), the search results, one or more ad records from the data store 120, and one or more function records from the data store 114. The ad generation module 118 may also receive (e.g., retrieve) data that indicates one or more native applications that are available on the user device 102 (i.e., the "available application data"), e.g., from the user device 102, the search system 100, or another location. The ad generation module 118 then generates the advertisement based on data included in at least one of the query wrapper, the search results, the one or more ad records, and the one or more function records. The ad generation module 118 may also generate the advertisement based on the available application data.

As one example, the ad generation module 118 may determine that a native application referenced by the search results is not available on the user device 102. For example, the ad generation module 118 may identify an AAM included in the search results that specifies a native application that is not also specified by the available application data. As a result, the ad generation module 118 may determine that the native application is not available on the user device 102. Subsequently, the ad generation module 118 may access a function record that includes the AAM in the data store 114. The ad generation module 118 may then identify an ad record in the data store 120 that corresponds to the identified function record. For example, for the ad record to correspond to the function record, the function record and the ad record may both reference the unavailable native application. As one example, the function record (i.e., the AAM of the function record) and the ad record may both specify the same application state of the unavailable native application. As another example, the function record may specify an application state of the unavailable native application, and the ad record may specify the application itself. Alternatively, the ad generation module 118 may identify the ad record in the data store 120 directly using the AAM.

In any case, in the event the ad record specifies the application state of the unavailable native application also specified by the AAM, the ad generation module 118 may generate the advertisement for the application state of the application. In the event the ad record specifies the unavailable native application itself, the ad generation module 118 may generate the advertisement for the application. In either case, the ad generation module 118 may generate the advertisement for the unavailable native application, or the application state thereof, using data included in the ad record (e.g., ad content) and transmit the advertisement to the user device 102.

In other examples, the user device 102, the search system 100, and/or another device or system may determine that a native application referenced by the search results is not available on the user device 102, and provide an indication of the determination to the ad generation module 118. The ad generation module 118 may then generate and transmit the advertisement to the user device 102 in a similar manner as described above.

Advertisers of applications may use the advertiser device(s) 108 to generate one or more ad records included in the data store 120. For example, the advertiser device(s) 108 may transmit advertisement data provided by the advertisers to the ad system 106. The record generation module 116 may generate one or more ad records based on the advertisement data and store the records in the data store 120. The advertiser device(s) 108 may provide an interface (e.g., a GUI) that the advertisers may use to generate the advertisement data. The interface may allow the advertisers to upload ad content and input ad parameters and other data to be included in an ad record. The interface may include a set of text fields, check boxes, or other user interface elements for generating advertisement data to be included in an ad record.

Figure 4C:
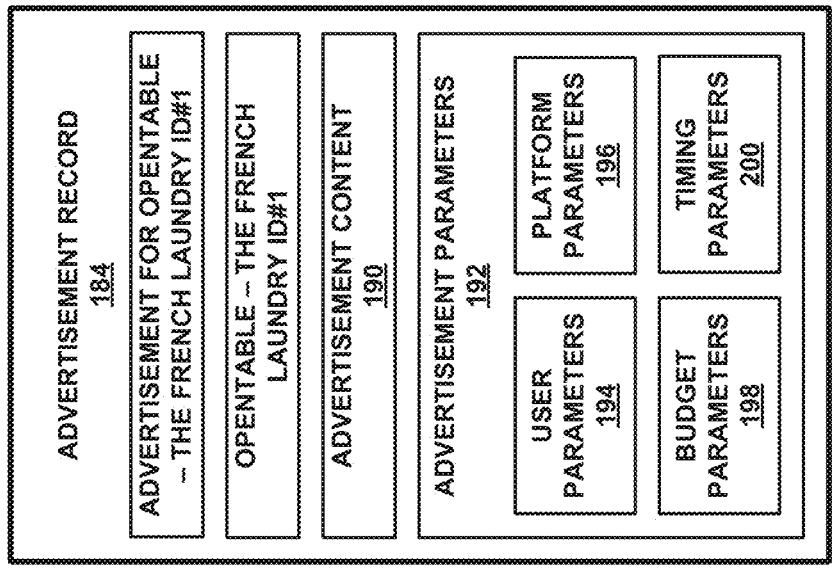
FIGS. 4B and 4C depict example advertisement records included in an advertisement data store of an advertisement system.
Figure 4B:
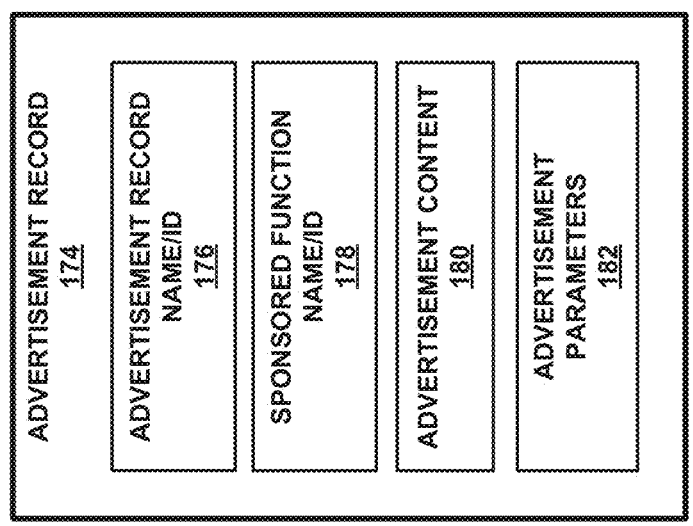

FIGS. 4B and 4C illustrate example ad records 174 and 184. An ad record may include a variety of different types of data related to an advertisement. For example, the ad record 174 includes an ad record name/ID 176, a sponsored function name/ID 178, ad content 180, and ad parameters 182. The ad record 174 may represent data stored in the data store 120 of the ad system 106 that is related to an advertisement. The data store 120 may include one or more other ad records each having a similar structure as that of the ad record 174. In other words, the data store 120 may include one or more ad records each indicating one or more of an ad record name/ID, a sponsored function name/ID, ad content, and ad parameters.

The ad record name/ID 176 identifies the ad record 174 among other ad records included in the data store 120. For example, the ad record name/ID 176 may uniquely identify the ad record 174. The ad record name/ID 176 may be a string of alphabetic, numeric, and/or symbolic characters (e.g., punctuation marks) that uniquely identify the ad record 174. In some examples, an advertiser generates the ad record name/ID 176. In other examples, the advertiser may access and update the ad record 174 using the ad record name/ID 176.

The sponsored function name/ID 178 identifies the sponsored function, or application state, of a native application associated with the ad record 174. As described below, the ad content 180 and the ad parameters 182 may be used to generate an advertisement for the sponsored function. The sponsored function name/ID 178 may include data that identifies the sponsored function of the native application, such as a function ID associated with the function. In some examples, the sponsored function name/ID 178 includes data that identifies the native application itself, rather than a particular function of the application (e.g., in cases where the sponsored function corresponds to a function performed by the application as a whole, rather than by a specific application state of the application).

A sponsored function may be associated with an ad record in the data store 120 and a function record in the data store 114. For example, an ad record in the data store 120 may include advertisement data related to a sponsored function. Additionally, a function record in the data store 114 may include function or application state data related to the sponsored function. As such, the sponsored function name/ID 178 may correspond to a function ID of a function record in the data store 114, thereby associating the ad record 174 with the function record. FIGS. 3C and 4C illustrate how a sponsored function name/ID of an ad record may be associated with a function ID of a function record. Some functions referenced by the function records in the data store 114 may not be associated with ad records, because advertisers may not sponsor all functions referenced by the function records.

As an example, the ad record 184 depicted in FIG. 4C includes an ad record name "Advertisement for OpenTable—The French Laundry" having an ID "#1." The ad record 184 also includes a sponsored function name "OpenTable—The French Laundry" having an ID "#1." In this example, the native application associated with the ad record 184 is OpenTable. The sponsored function associated with the ad record 184 is an entry in OpenTable for the restaurant The French Laundry. As such, the ad record 184 is an ad record for the application state, or entry, within OpenTable for The French Laundry. In this manner, the ad record 184 may be referred to as a "sponsored function record," or a "sponsored record."

In this example, the data store 114 may include a function record that corresponds to the application state, or entry, within OpenTable for The French Laundry. For example, with reference to FIG. 3C, the data store 114 may include the function record 162 having the function ID "OpenTabl—The French Laundry," which corresponds to the sponsored function name/ID of the ad record 184. As such, the function record 162 and the ad record 184 both reference the sponsored function "OpenTable—The French Laundry." As described above, the ad system 106 (e.g., the ad generation module 118) may generate an advertisement for the sponsored function using data from the ad record 184 (e.g., ad content 190) and/or the function record 162.

Referring back to FIG. 4B, the ad record 174 includes ad content 180. The ad content 180 may include data that is used by the ad system 106 (e.g., by the ad generation module 118) to generate an advertisement for the sponsored function. For example, the ad content 180 may include text and/or image data associated with one or more promotions or discounts related to the sponsored function, e.g., for one or more products or services provided by, or available via, the corresponding native application. The ad content 180 may include data that specifies conditions or terms of the promotions or discounts, such as one or more item names, item numbers, dollar amounts, times, and dates applicable thereto. In some examples, the ad content 180 includes text and/or image data that, when incorporated into the advertisement, displays one or more of the conditions or terms to the user (e.g., "10% OFF," or "$10 OFF"). In other examples, the ad content 180 may include text and/or image data that, when incorporated into the advertisement, prompts the user to download the corresponding native application (e.g., "Download Now!").

The ad content 180 may also include data that may be transmitted to the user device 102 to enable the user to take advantage of the conditions or terms of the advertisement with respect to the sponsored function. For example, upon rendering the native application available on the user device 102, the user device 102 may cause the application to perform one or more operations to set the application into the application state that corresponds to the sponsored function. Using the data described above, the user device 102 may also configure, or set, the application to reflect the conditions or terms of the advertisement. For example, using the data, the user device 102 (or a server of a third party application) may apply the one or more promotions or discounts specified by the advertisement to a product or service associated with the sponsored function.

The ad parameters 182 may specify when the ad system 106 (e.g., the ad generation module 118) generates the advertisement. For example, as shown in the ad record 184, the ad parameters 192 may include user parameters 194, platform parameters 196, budget parameters 198, and/or timing parameters 200. As a result, the ad generation module 118 may generate the advertisement for one or more users or platforms (e.g., operating systems) of the user device 102 as defined by the user parameters 194 and the platform parameters 196. The ad generation module 118 may also generate the advertisement for a defined number of users based on a budget associated with the advertisement (e.g., an advertisement campaign related to the advertisement) specified by the budget parameters 198. Additionally, the ad generation module 118 may generate the advertisement during one or more specified times or dates defined by the timing parameters 200.

Figure 5:
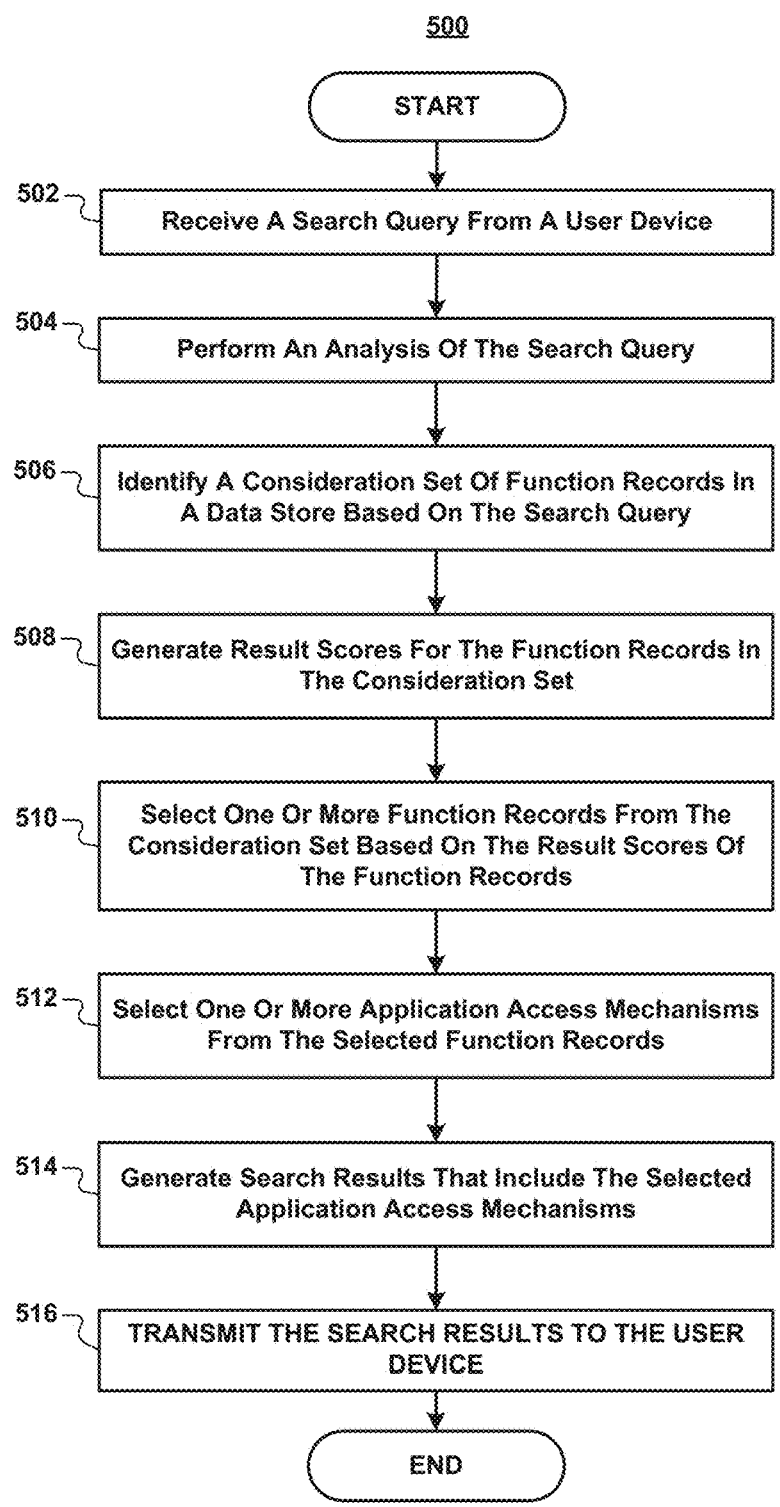
FIG. 5 is a flow diagram illustrating an example set of operations for a method of performing a search for function records based on a search query received from a user device.

FIG. 5 is a flow diagram that illustrates an example set of operations for a method 500 of performing a search for function records (e.g., the function record 152) based on a search query (e.g., the search query 142) received from a user device (e.g., one of the user device(s) 102). The method 500 is described with reference to the search system 100, the user device(s) 102, and the components thereof, as depicted in FIGS. 1-3.

In block 502, the query analysis module 144 receives a search query 142 from one of the user device(s) 102. For example, the user device 102 may have generated the search query 142 based on a user input (e.g., into a search field 130 of a GUI of a search application 126). In block 504, the query analysis module 144 performs an analysis of the search query 142. For example, the query analysis module 144 may perform tokenization, synonymization, filtering, stemming, stop word removal, and/or any other type of analysis with respect to the search query 142. In block 506, the set generation module 146 identifies a consideration set of one or more function records included in the data store 114 based on the analyzed search query 142 (i.e., based on an output of the query analysis module 144).

In blocks 508-510, the set processing module 148 processes the consideration set. Specifically, in block 508, the set processing module 148 generates one or more result scores for the one or more function records included in the consideration set. For example, the set processing module 148 may generate a result score for each function record included in the consideration set. Furthermore, in block 510, the set processing module 148 selects one or more function records from the consideration set based on result scores associated with the function records. For example, the set processing module 148 may select one or more function records in the consideration set that have the highest one or more result scores.

In block 512, the set processing module 148 selects one or more AAMs from the selected function records. In block 514, the set processing module 148 generates search results 150 that include the selected AAMs. As described above, the search results 150 may also include the result scores associated with the selected function records. As also described above, the search results 150 may also include link data (e.g., text and/or image data) for each selected AAM. In block 516, the set processing module 148 transmits the search results 150, including the selected AAMs, to the user device 102 that generated the search query 142.

Figure 6:
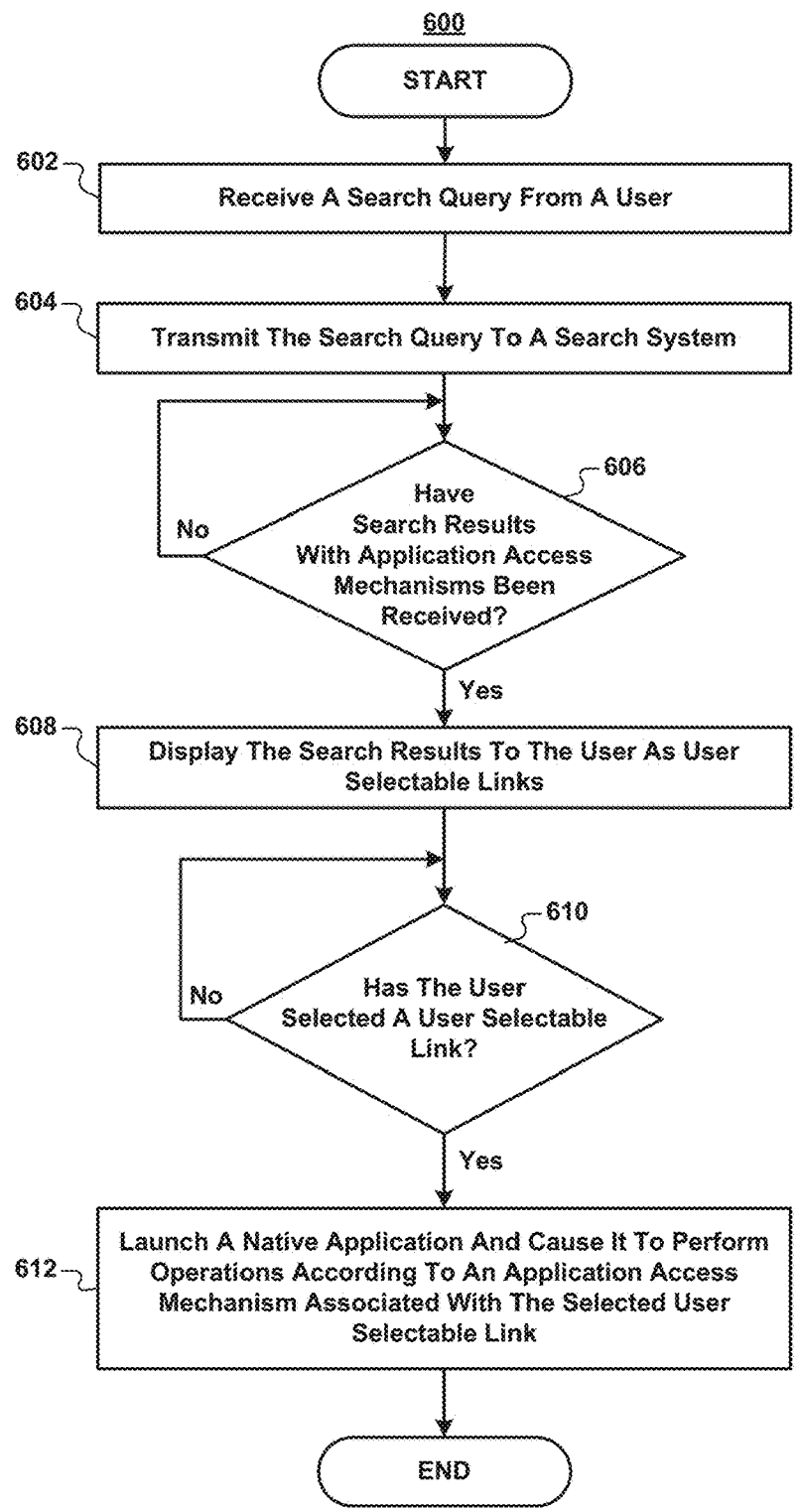
FIG. 6 is a flow diagram illustrating an example set of operations for a method of performing a search for software application states from a user device.

FIG. 6 is a flow diagram that illustrates an example set of operations for a method 600 of performing a search for software application states from a user device (e.g., one of the user device(s) 102). The method 600 is described with reference to the search system 100, the user device(s) 102, and the components thereof, as depicted in FIGS. 1-3. The user device 102 described with reference to the method 600 may include a search application 126 (e.g., a native or web-based application) that is configured to receive a user input and communicate with the search system 100. Specifically, the search application 126 executing on the user device 102 may generate a GUI that receives search queries (e.g., the search query 142) from users and displays search results (e.g., the search results 150) received from the search system 100 in response to the search queries.

In block 602, the search application 126 receives a search query 142 from a user (e.g., of the user device 102). For example, the user may have entered the search query 142 into the GUI (e.g., into a search field 130 of the GUI) of the search application 126. In block 604, the user device 102 transmits the search query 142 to the search system 100. In block 606, the user device 102 waits to receive search results 150 that are responsive to the search query 142. The method 600 proceeds from block 606 to block 608 when the user device 102 receives the search results 150, including one or more AAMs, from the search system 100.

In block 608, the search application 126 displays the search results 150 to the user as (e.g., a list of) one or more user selectable links. As described above, the search results 150 include one or more AAMs. As described herein, the search results 150 may also include a result score and link data (e.g., text and/or image data) for each of the AAMs. As such, the search application 126 may generate a user selectable link for each AAM included in the search results 150 using the link data associated with the AAM. The search application 126 may then display the generated user selectable links to the user via the GUI of the search application 126. For example, the search application 126 may arrange (e.g., sort) the generated user selectable links into a list based on the result scores associated with the corresponding AAMs, and then display the list to the user. For example, the search application 126 may place a user selectable link associated with an AAM having a larger result score higher within the list (e.g., closer to the top of the GUI) relative to a user selectable link associated with an AAM having a smaller result score.

In block 610, the search application 126 waits for the user to select (e.g., touch, or click on, within the GUI of the search application 126) one of the generated user selectable links. The method 600 proceeds from block 610 to block 612 when the user selects one of the user selectable links. As described herein, the AAM associated with the selected user selectable link specifies a native application and indicates one or more operations for the application to perform. Accordingly, in block 612, in response to the user selecting the user selectable link, the user device 102 launches the native application specified by the AAM and causes it to perform the one or more operations indicated by the AAM.

Figure 7:
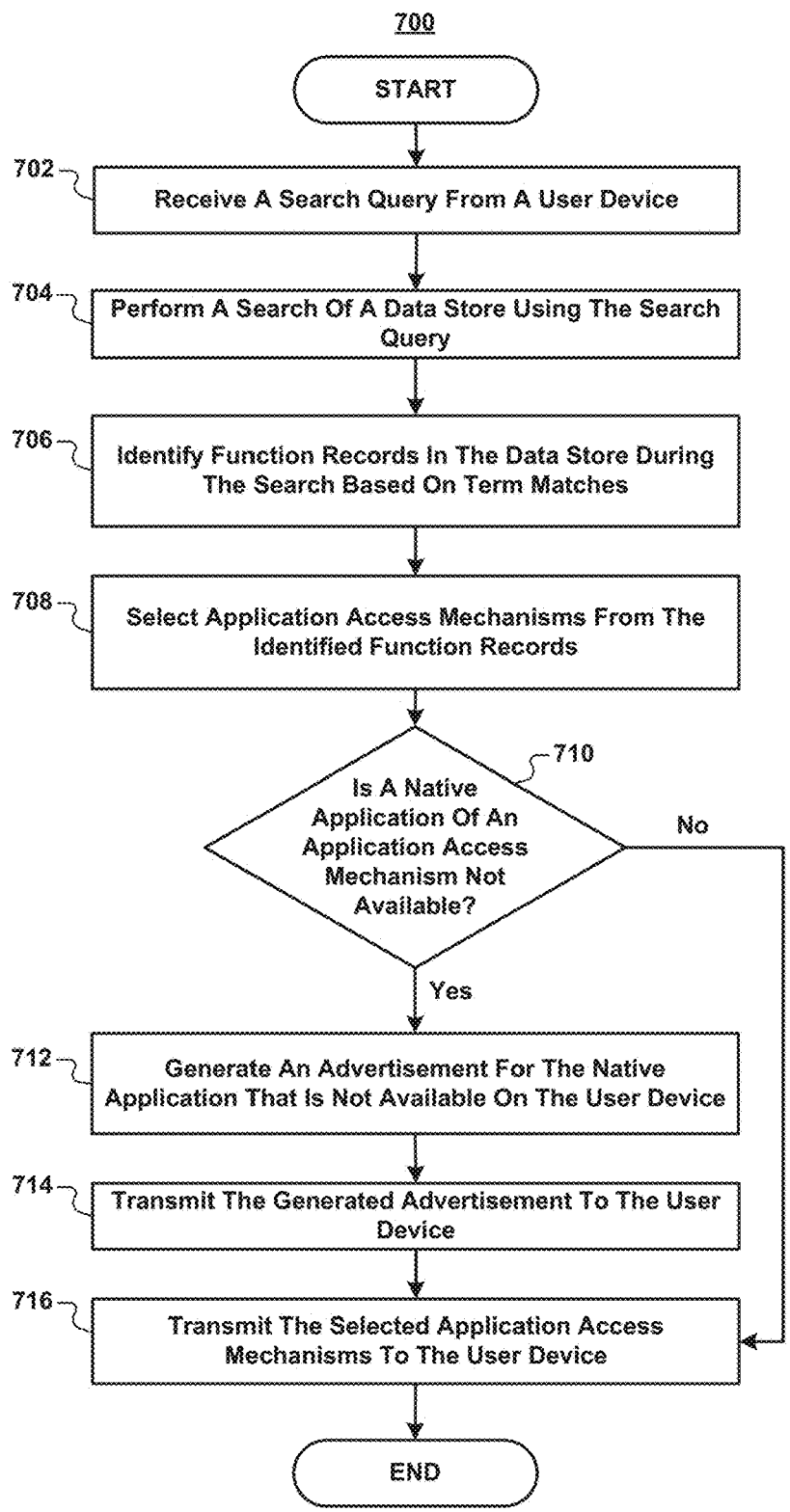
FIG. 7 is a flow diagram illustrating an example set of operations for a method of generating advertisements for function records.

FIG. 7 is a flow diagram that illustrates an example set of operations for a method 700 of generating advertisements (e.g., the advertisement 220 of FIGS. 11A-11C and 12A) for function records (e.g., the function record 152) and transmitting the advertisements to a user device (e.g., one of the user device(s) 102). The method 700 describes generating advertisements for function records in the context of performing a search for function records based on a search query received from a user device, as described above with reference to the method 500 of FIG. 5. The method 700 is described with reference to the search system 100, the user device(s) 102, and the components thereof, as depicted in FIGS. 1-3, and with reference to the ad system 106 of FIGS. 1, 2, and 4.

In block 702, the query analysis module 144 receives a search query 142 from one of the user device(s) 102. In some examples, the query analysis module 144 analyzes the search query 142. In block 704, the set generation module 146 performs a search of the data store 114 using the search query 142. In block 706, the set generation module 146 identifies one or more function records (i.e., a consideration set) included in the data store 114 during the search of the data store 114 (e.g., based on matches between terms of the search query 142 and terms of ASI included in each identified function record). Additionally, the set processing module 148 may process (e.g., score) the identified function records.

In block 708, the set processing module 148 selects one or more AAMs from the identified function records to generate the search results 150. In block 710, the ad system 106 determines whether a native application specified by at least one of the selected AAMs is unavailable on the user device 102. For example, the ad system 106 may determine that the native application is not available on the user device 102 if the user device 102 does not have the application installed.

In some examples, to determine whether a native application specified by at least one of the selected AAMs is unavailable on the user device 102, the ad system 106 receives data that indicates one or more native applications that are available on the user device 102. As one example, the ad system 106 may receive the data from the user device 102. As another example, the ad system 106 may receive (e.g., retrieve) the data from another location (e.g., a server) other than the user device 102. In this example, the user device 102 may transmit the data to the other location.

In the event the ad system 106 determines that a native application specified by at least one of the selected AAMs is not available on the user device 102, the method 700 proceeds from block 710 to block 712. Alternatively, in the event the ad system 106 determines that each native application specified by the selected AAMs is available on the user device 102, the method 700 proceeds from block 710 to block 716.

In block 712, the ad system 106 generates an advertisement for the native application that is unavailable on the user device 102, or for an application state thereof. As described above, the ad system 106 may generate the advertisement using ad content (e.g., the ad content 180) for the advertisement. The ad content may be included in an ad record (e.g., the ad record 174) for the advertisement. The ad record, in turn, may be included in the data store 120 of the ad system 106. In some examples, the ad record specifies the native application. In other examples, the ad record may specify an application state of the native application (e.g., via the sponsored function name/ID 178) that is also specified by the selected AAM for the application. In some examples, the functionality attributed to the ad system 106 with reference to blocks 710-712 is performed by another system, device, or module (e.g., the search system 100).

In blocks 714 and 716, the search system 100 transmits the advertisement and the selected AAMs (i.e., the search results 150) to the user device 102. In some examples, in block 714, the ad system 106 transmits the advertisement directly to the user device 102. The user device 102 can receive the selected AAMs and the advertisement and display them to a user of the user device 102 that generated the search query 142, as described below with reference to FIG. 8. Alternatively, in the event the ad system 106 determines that each native application specified by the selected AAMs is available on the user device 102, the method 700 proceeds from block 710 directly to block 716. As a result, in block 716, the search system 100 transmits the selected AAMs (i.e., the search results 150) to the user device 102, without generating an advertisement or transmitting it to the user device 102.

In the example of the method 700, the manner in which the search system 100 transmits the selected AAMs to the user device 102 may vary depending on whether a native application specified by at least one of the AAMs is unavailable on the user device 102. As one example, in the event a native application specified by at least one of the selected AAMs is not available on the user device 102, the search system 100 may transmit the selected AAM that specifies the unavailable native application with a subset of data otherwise included in the AAM, or different data. For example, the search system 100 may transmit the AAM along with an ADA for the native application. In this example, the AAM may not include data that indicates one or more operations for the native application to perform, since the application is not available on the user device 102. The search system 100 may transmit the data that indicates the operations to the user device 102 once the native application becomes available on the user device 102. As another example, in the event each native application specified by the selected AAMs is available on the user device 102, the search system 100 may transmit the AAMs in their entirety (i.e., including one or more operations for each application to perform), with or without an ADA for each application. In other examples, the search system 100 may transmit the selected AAMs in their entirety irrespective of whether a native application specified by at least one of the AAMs is not available on the user device 102.

Figure 8:
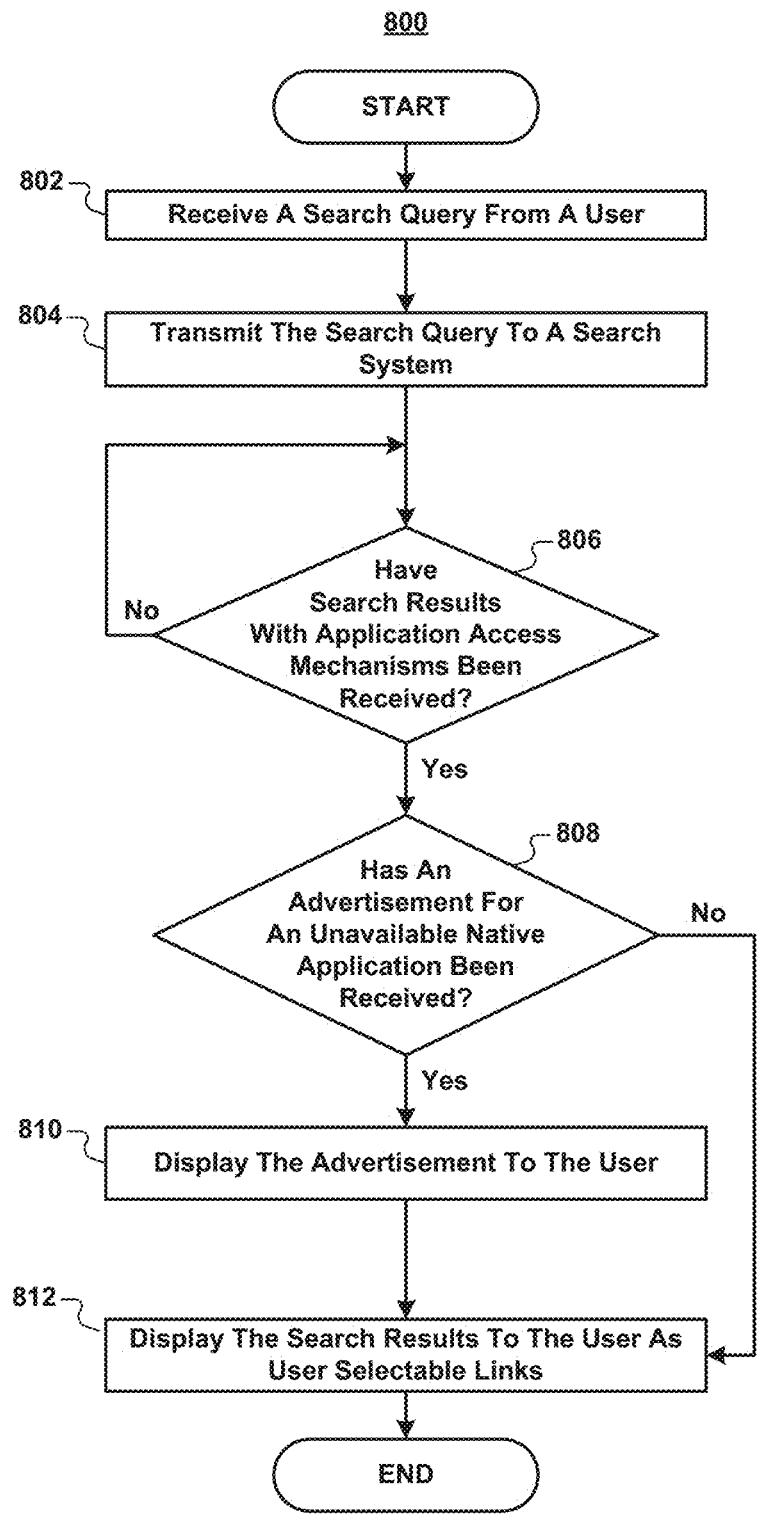
FIG. 8 is a flow diagram illustrating an example set of operations for a method of receiving application access mechanisms (AAMs) and advertisements at a user device.

FIG. 8 is a flow diagram that illustrates an example set of operations for a method 800 of receiving AAMs and advertisements at a user device. The method 800 describes receiving AAMs and advertisements in the context of performing a search for software application states from a user device, as described above with reference to the method 600 of FIG. 6. The method 800 is described with reference to the search system 100, the user device(s) 102, and the components thereof, as depicted in FIGS. 1-3, and with reference to the ad system 106 of FIGS. 1, 2, and 4.

In block 802, the user device 102 receives a search query 142 from a user. In block 804, the user device 102 transmits the search query 142 to the search system 100. In block 806, the user device 102 waits to receive search results 150 that are responsive to the search query 142. The method 800 proceeds from block 806 to block 808 when the user device 102 receives the search results 150, including one or more AAMs, from the search system 100.

In block 808, the user device 102 waits to receive an advertisement for a native application that is unavailable on the user device 102, or for an application state thereof. In this example, the native application is specified by at least one of the received AAMs included in the search results 150. For example, the user device 102 may receive the advertisement from the search system 100 and/or the ad system 106. In this example, the ad system 106 may have generated the advertisement using ad content included in an ad record that specifies the native application, or the application state thereof, as described above with reference to the method 700 of FIG. 7. For example, the ad system 106 may transmit the advertisement directly to the user device 102, or to the search system 100 for transmission to the user device 102.

In the event the user device 102 receives the advertisement, the method 800 proceeds from block 808 to block 810. Alternatively, in the event the user device 102 does not receive the advertisement, the method 800 proceeds from block 808 directly to block 812.

In block 810, the user device 102 displays (e.g., via the GUI of the search application 126) the received advertisement to the user that generated the search query 142. For example, the search application 126 may display the received advertisement to the user along with (e.g., a list of) one or more user selectable links generated for the received AAMs (i.e., the search results 150). In block 812, the user device 102 displays (e.g., also via the GUI) the user selectable links themselves (e.g., as a list). Accordingly, in the event the user device 102 receives the advertisement for the native application that is unavailable on the user device 102, or for the application state thereof, the user device 102 displays the advertisement to the user (810) along with the generated user selectable links (812). For example, the user device 102 may display the advertisement proximate to (e.g., within the same GUI element as) the generated user selectable link for the received AAM that specifies the unavailable native application. In this example, the user can select the user selectable link to render the native application available on the user device 102 (e.g., to download and install the application on the user device 102), as described below with reference to FIG. 9. For example, the user may select the user selectable link if the user finds the advertisement (e.g., located proximate to the user selectable link in the list of the generated user selectable links) enticing or appealing to the user.

Alternatively, in the event the user device 102 does not receive the advertisement, the user device 102 does not display the advertisement to the user. Instead, the user device 102 displays the search results 150, including the received AAMs, to the user as (e.g., the list of) the user selectable links. The user can then select a particular one of the user selectable links to launch a native application specified by the corresponding one of the received AAMs.

In some examples, the user device 102 transmits data that indicates one or more native applications that are available on the user device 102. The user device 102 may transmit the data to the search system 100 and/or the ad system 106. Alternatively, the user device 102 may transmit the data to another location (e.g., a server). In this example, one or more of the systems 100, 106 may receive (e.g., retrieve) the data from the other location, e.g., at a later point in time. One or more of the systems 100, 106 may use the data to determine whether a native application specified by at least one of the received AAMs is not available on the user device 102. Based on the determination, one or more of the systems 100, 106 may generate the advertisement for the native application that is unavailable on the user device 102, or for the application state thereof, and transmit the advertisement to the user device 102, as described above.

In other examples, to receive the advertisement for the native application that is unavailable on the user device 102, or for the application state thereof, the user device 102 may transmit a request for the advertisement to one or more of the systems 100, 106. For example, the user device 102 may first determine whether a native application specified by at least one of the received AAMs included in the search results 150 is unavailable on the user device 102. For instance, the user device 102 may determine that the native application is not available on the user device 102 if the user device 102 does not have the application installed. Upon determining that a native application specified by at least one of the received AAMs is unavailable on the user device 102, the user device 102 may transmit a request for an advertisement for the application, or an application state thereof, to one or more of the systems 100, 106, and receive the advertisement in response to the transmitted request.

In the example of the method 800, the content of the received AAMs may vary depending on whether a native application specified by at least one of the AAMs is unavailable on the user device 102. For example, in the event a native application specified by at least one of the AAMs is not available on the user device 102, the received AAM that specifies the application may include a subset of data otherwise included in the AAM, or different data. As one example, the AAM may include an ADA for the native application. In this example, the AAM may not include data that indicates one or more operations for the native application to perform, since the application is not available on the user device 102. The user device 102 may receive the data that indicates the operations once the native application becomes available on the user device 102. As another example, in the event each native application specified by the received AAMs is available on the user device 102, the AAMs may be transmitted in their entirety (i.e., including the one or more operations for the corresponding native applications to perform), with or without ADAs. In some examples, the AAMs are transmitted in their entirety irrespective of whether a native application specified by at least one of the AAMs is not available on the user device 102.

Figure 9:
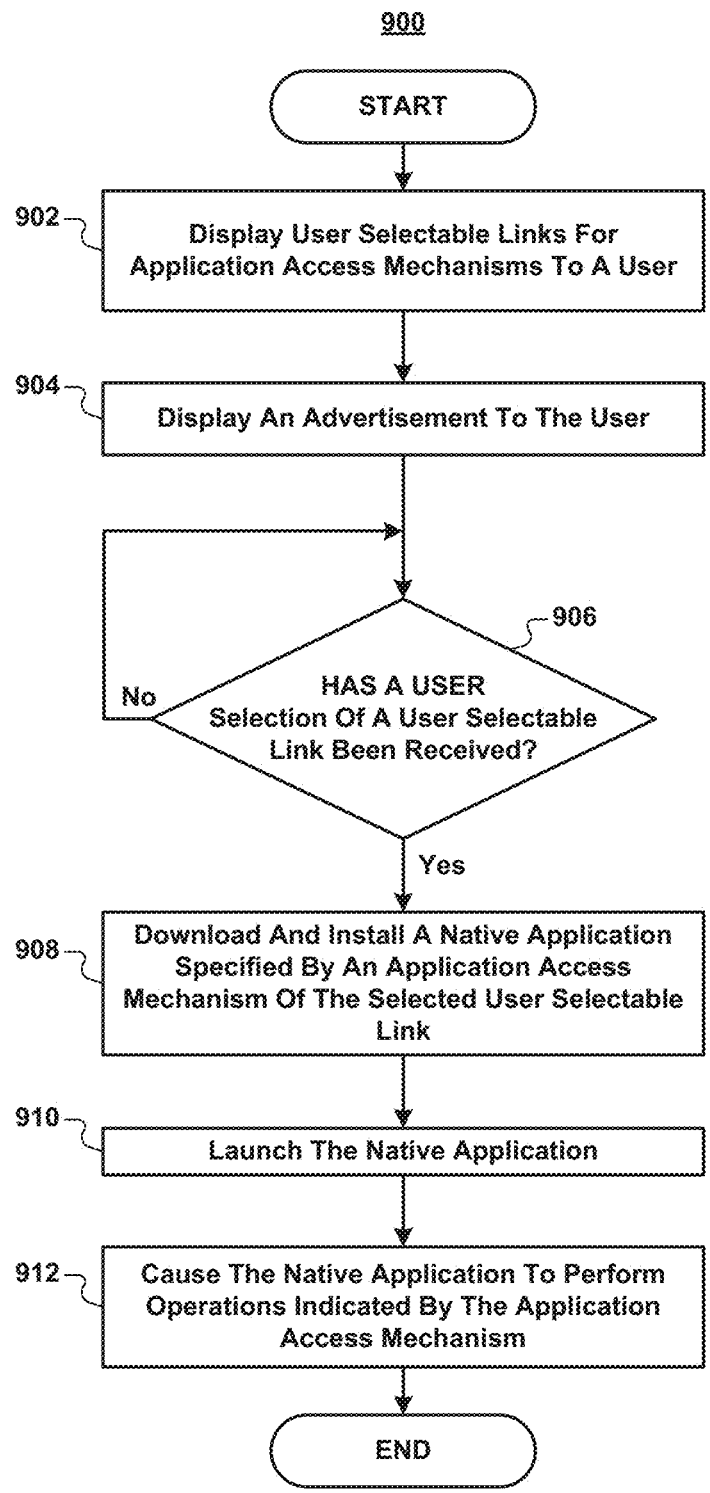
FIG. 9 is a flow diagram illustrating an example set of operations for a method of accessing native application states using AAMs.

FIG. 9 is a flow diagram that illustrates an example set of operations for a method 900 of accessing native applications at a user device (e.g., one of the user device(s) 102) using AAMs. The method 900 describes accessing native applications using AAMs in the context of receiving AAMs and advertisements at a user device, as described above with reference to the method 800 of FIG. 8. The method 900 is described with reference to the search system 100, the user device(s) 102, and the components thereof, as depicted in FIGS. 1-3.

In block 902, one of the user device(s) 102 displays (e.g., a list of) one or more user selectable links including (i.e., generated for) one or more AAMs to a user. In the example of the method 900, a native application specified by at least one of the AAMs is not available (e.g., not installed) on the user device 102. As such, the user selectable links include a user selectable link for the AAM that specifies the unavailable native application. In this example, the user selectable link may indicate to the user that the native application is not available on the user device 102, e.g., using text and/or image data. For example, the user device 102 may display the data within, or proximate to (e.g., within the same GUI element as), the user selectable link. In some examples, the data includes one or more ADAs that enable the user device 102 to download the unavailable native application, e.g., from a digital distribution platform.

In this example, because a native application specified by at least one of the AAMs is not available on the user device 102, the user device 102 may also receive an advertisement for the application, or for an application state thereof. As such, in block 904, the user device 102 displays the received advertisement to the user along with the (e.g., list of the) user selectable links. For example, the user device 102 may display the advertisement within, or proximate to (e.g., within the same GUI element as) the user selectable link for the AAM that specifies the unavailable native application. As explained above, the advertisement may include text and/or image data that indicates one or more discounts or promotions related to products, services, or vendors associated with, or accessible via, the native application, or the application state thereof.

The user can select (e.g., touch, or click on) the user selectable link for the AAM that specifies the unavailable native application to render the application available on the user device 102. For example, the user can cause the user device 102 to download and install the native application on the user device 102, as described in greater detail below. The user can select the user selectable link in the event the user finds the advertisement (e.g., located within, or proximate to, the user selectable link) appealing or enticing. Accordingly, in block 906, the user device 102 waits for the user to select the user selectable link for the AAM. The method 900 proceeds from block 906 to block 908 when the user selects the user selectable link.

In block 908, in response to the user selecting the user selectable link for the AAM that specifies the unavailable native application, the user device 102 renders the application available on the user device 102 using the AAM. In some examples, to render the native application available, the user device 102 first downloads the application, e.g., from a digital distribution platform, such as GOOGLE PLAY® developed by Google Inc., using the AAM. Subsequently, the user device 102 may install the downloaded native application on the user device 102. For example, the user device 102 may receive data that includes an ADA for the native application along with, or as part of, the received AAM. The user device 102 may then display a GUI element for the ADA to the user. For instance, the user device 102 may display the GUI element along with (e.g., within, or proximate to) the user selectable link for the AAM. In this example, the user may select the GUI element, which may direct the user device 102 to a site (e.g., a digital distribution platform) for downloading the native application. As a result, the user device 102 may download the native application onto the user device 102 and install the application on the user device 102.

In block 910, the user device 102 launches the newly available (e.g., downloaded and installed) native application according to the AAM associated with the user selectable link selected by the user. As explained herein, the AAM specifies the native application, thus enabling the user device 102 to launch the application, e.g., by causing the user device 102 to perform one or more operations. The operations may be performed by the OS 122, the search application 126, and/or the native application.

In some examples, rather than automatically launching the native application upon rendering it available, the user device 102 updates the (e.g., list of the) user selectable links displayed to the user to include a new user selectable link in place of the previously described user selectable link for the application (i.e., for the AAM that specifies the application). Specifically, the user device 102 may generate the new user selectable link to include an indication that the native application is now available on the user device 102. Additionally, in contrast to the previously described user selectable link enabling the user to render the native application available on the user device 102, the new user selectable link may enable the user to launch the application using the user device 102. The new user selectable link may be generated using the AAM and link data described above, or a new or updated AAM and link data received by the user device 102. The user may select the new user selectable link to cause the user device 102 to launch the native application and cause it to perform a function, as described below.

In block 912, the user device 102 causes the launched native application to perform one or more operations indicated by the AAM for the user selectable link selected by the user. The operations may be included in the AAM when it is transmitted to the user device 102, or received after the native application becomes available on the user device 102. In any case, the native application may be set into an application state that corresponds to the operations. As described above, upon performing the operations, the native application may be configured, or set, to display information that describes one or more products, services, or vendors provided by, or accessible via, the application, or an application state thereof, to the user. In this example, the native application may display the information via a GUI of the application, e.g., using any combination of text, image, video, and audio data.

FIGS. 10A and 10B illustrate example GUIs that may be generated on the user device 102 according to the present disclosure. Specifically, FIG. 10A shows an example GUI of the search application 126 executing on the user device 102. FIG. 10B, in turn, shows an example GUI of a native application executing on the user device 102 after the application has been set into a particular application state.

In FIG. 10A, a user has entered a search query 134 into a search field 130 of the GUI. The search query 134 includes the string "Late night diners" and is a specific example of the search query 142 of FIG. 3A. The user has selected a search button 132 of the GUI, causing the user device 102 to transmit the search query 134 to the search system 100 as part of a query wrapper. The search system 100 has received the query wrapper from the user device 102 and has identified multiple function records in the data store 114 based on the search query 134 of the query wrapper. The search system 100 has processed the identified function records and has selected AAMs from the records.

In the example of FIG. 10A, the search system 100 has identified function records that correspond to application states in Yelp and TripAdvisor. Specifically, the search system 100 has identified function records that correspond to entries in Yelp for "IHOP", "Denny's," and "Taco Bell." The search system 100 has also identified a function record that corresponds to a default application state (e.g., the main page, or home screen) in TripAdvisor. Additionally, the search system 100 has identified a function record that corresponds to an application state in a web-based version of OpenTable. In this example, the application state may correspond to a web page in the web-based version of OpenTable that includes search results responsive to the search query 134. The search system 100 has also identified a function record that corresponds to an application state in Urbanspoon, which is not available on the user device 102.

In this example, the search system 100 has selected multiple AAMs and a WAM from the function records described above. Specifically, the AAMs selected by the search system 100 from the function records for the above-described entries in Yelp and Urbanspoon enable the user device 102 to access the corresponding application states within Yelp and Urbanspoon. Similarly, the AAM selected by the search system 100 from the function record for the application state in TripAdvisor enables the user device 100 to access the default application state within TripAdvisor. In this example, the search system 100 has selected a WAM (e.g., a URL) from the function record for the application state in OpenTable. The WAM enables the user device 102 to access the application state within OpenTable (e.g., via the web browser application 124).

As explained above, Urbanspoon is not available on the user device 102. As such, the search system 100 may select additional data from the function record for the application state in Urbanspoon, or from another location. The additional data may include an ADA that may enable the user device 102 to render Urbanspoon available on the user device 102. In some examples, the search system 100 selects the additional data upon determining that Urbanspoon is not available on the user device 102. In other examples, the search system 100 may select the additional data irrespective of such a determination (e.g., automatically when the data is available). In these examples, the user device 102 may use the additional data to render Urbanspoon available on the user device 102 upon determining that Urbanspoon is not available on the user device 102.

In the example of FIG. 10A, the search system 100 has transmitted the selected AAMs and WAM described above to the user device 102 as part of the search results. The search system 100 may have also transmitted the above-described ADA for Urbanspoon as part of the search results. In some examples, the search system 100 determines that Urbanspoon is not available on the user device 102 and transmit the selected AAM that corresponds to the application state in Urbanspoon without one or more operations indicated by the AAM. In these examples, the search system 100 may transmit the operations, e.g., as part of a new or updated AAM, to the user device 102 once Urbanspoon becomes available on the user device 102. In other examples, the search system 100 may transmit the selected AAM in its entirety irrespective of whether Urbanspoon is available on the user device 102. In these examples, the user device 102 may not perform the operations indicated by the AAM until the user device 102 renders Urbanspoon available on the user device 102.

In the example of FIG. 10A, the search system 100 has also transmitted link data (e.g., text and/or image data) associated with each of the AAMs and WAM as part of the search results. The user device 102 has generated user selectable links (hereinafter, "links") 202, 204A-204C, 206, 208, and 212 shown in FIG. 10A using the AAMs and WAM and the link data associated therewith. Specifically, the user device 102 has generated the links 204A-204C for the AAMs selected by the search system 100 from the function records for the above-described entries in Yelp. Similarly, the user device 102 has generated the links 206, 208, and 212 for the AAMs and WAM selected by the search system 100 from the function records for the above-described application states in TripAdvisor, OpenTable, and Urbanspoon, respectively. In this example, the user device 102 has also generated the link 202 for Yelp, i.e., for the default application state, or main page/screen, within Yelp. The user device 102 may have generated the link 202 without having received an AAM selected by the search system 100 from a function record for the main application state in Yelp. Instead, the user device 102 may have generated the link 202 using one or more of the AAMs that correspond to the links 204A-204C, or portions thereof (e.g., portions of the AAMs that reference Yelp).

As shown in FIG. 10A, each of the links 202, 204A-204C, 206, 208, and 212 includes text and/or image data (e.g., the text "IHOP" and the image of pancakes included in the link 204A for the entry in Yelp for "IHOP"). As also shown, some of the links include other data, such as user ratings data (e.g., in the form of one to five stars), user reviews data, and application state, or entry, enumeration data. The user of the user device 102 may select (e.g., touch, or click on) any of the links 202, 204A-204C, 206, 208, and 212 to cause the user device 102 to access the corresponding application state within a native or web-based application using the AAM or WAM associated with the link. For example, the user may select an area of the example GUI of FIG. 10A that includes the link to cause the user device 102 to access the application state.

The link 208 for OpenTable includes a web address GUI element 210. The GUI element 210 includes a portion of the search query 134 "Late night diners," thereby indicating that the application state within OpenTable that corresponds to the link 208 is a web page that includes search results responsive to the search query 134. In this example, one or more of the link 208 and the GUI element 210 include the WAM that enables the user device 102 to access the application state within OpenTable. As a result, the user may select one or more of the link 208 and the GUI element 210 to cause the user device 102 to access the application state using the WAM. For example, to access the application state using the WAM, the user device 102 may launch the web browser application 124 and retrieve information at a web address (e.g., URL) specified by the WAM using the web browser application 124.

The link 212 for Urbanspoon includes an application access GUI element 214 and a price indicator 216, which includes the term "Free." As described above, Urbanspoon is not available on the user device 102 of FIG. 10A. In this example, the price indicator 216 indicates that Urbanspoon can be made available on the user device 102 at no cost. Also in this example, the GUI element 214 indicates that Urbanspoon can be made available by downloading and installing Urbanspoon (e.g., from a digital distribution platform). The GUI element 214 may include the phrases "Download," or "Download Now!" In this example, one or more of the link 212, GUI element 214, and price indicator 216 include the ADA that enables the user device 102 to render Urbanspoon available on the user device 102. As a result, the user may select one or more of the link 212, GUI element 214, and price indicator 216 to cause the user device 102 to render Urbanspoon available on the user device 102 using the ADA. The user selecting any of these GUI objects may also cause the user device 102 to access the application state within Urbanspoon corresponding to the link 212, once Urbanspoon is available on the user device 102.

The links 202, 204A-204C, 206, 208, and 212 are grouped according to the native or web-based applications associated with the links. For example, the links 202 and 204A-204C are grouped together under the header "Yelp," with the link 202 corresponding to the header. In this example, the link 206 is the only link for TripAdvisor. Similarly, the links 208 and 212 are the only links for OpenTable and Urbanspoon, respectively. In other examples, the links 202, 204A-204C, 206, 208, and 212, or other links, may be distributed differently (e.g., not grouped) than shown in FIG. 10A.

Although only user selectable links for Yelp, TripAdvisor, OpenTable, and Urbanspoon are shown in the GUI of FIG. 10A, the search system 100 may have identified additional function records in the data store 114 that correspond to application states in these applications, or to application states in other native or web-based applications. The search system 100 may have selected one or more AAMs or WAMs from the additional function records and transmitted the AAMs or WAMs to the user device 102. The user device 102 may have generated user selectable links not shown in FIG. 10A for the AAMs or WAMs.

In the example of FIGS. 10A-10B, the user selects the link 204B. In this example, the link 204B corresponds to information within Yelp relating to a particular "Denny's®" restaurant. In response to the user selecting the link 204B, the user device 102 launches Yelp and causes it to perform one or more operations according to the AAM associated with the link 204B. In this example, the AAM may reference Yelp and indicate a path (e.g., within the user device 102, or via a remote server) for Yelp to find information for the Denny's® restaurant associated with the link 204B. For example, the AAM may include an ARI that references Yelp and indicates one or more operations for Yelp to perform, such as retrieving data using the path indicated by the AAM. Accordingly, the ARI of the AAM may cause Yelp to perform the function of retrieving and displaying the information for the Denny's® restaurant. An example ARI included in an AAM for an application state, or entry, within Yelp may include the string "yelp:///biz/dennys-sunnyvale."

FIG. 10B illustrates an example GUI 218 of Yelp that corresponds to the application state within Yelp indicated by the link 204B. In other words, the application state in Yelp, as depicted in FIG. 10B, is defined by the one or more operations indicated by the AAM associated with the link 204B. The user device 102 sets Yelp into the application state shown in FIG. 10B by causing Yelp to perform the operations. As described above, the user device 102 sets Yelp into the application state shown in FIG. 10B in response to the user selecting the link 204B within the GUI of FIG. 10A. As shown in FIG. 10B, the GUI 218 includes information regarding the particular Denny's® restaurant associated with the link 204B.

FIGS. 11A-11C illustrate other example GUIs that may be generated on the user device 102 according to the present disclosure. The example GUIs of FIGS. 11A-11C include many of the same GUI objects (i.e., user selectable links and GUI elements) described above with reference to FIG. 10A. Each of FIGS. 11A-11C shows an example GUI of a search application 126 that includes an advertisement 220 for Urbanspoon. In the examples of FIGS. 11A-11C, Urbanspoon is not available on the user device 102. In these examples, the ad system 106 has generated the advertisement 220, which includes the string "$10 OFF," and the search system 100 has transmitted the advertisement 220 to the user device 102. The search system 100 has also transmitted search results that are responsive to a search query 134. As shown in each of FIGS. 11A-11C, the search application 126 has displayed the received search results within the GUI of the search application 126 as links 202, 204A-204C, 206, 208, and 212. As described above with reference to FIG. 10A, each of the links 202, 204A-204C, 206, 208, and 212 references a native or a web-based application. As also shown in FIGS. 11A-11C, the search application 126 has displayed the advertisement 220 within, or proximate to, the link 212 for Urbanspoon.

In the example GUI of FIG. 11A, the user device 102 has displayed the advertisement 220 within an area of the GUI that includes the link 212 for Urbanspoon. The user device 102 has also displayed the application access GUI element 214 for Urbanspoon within the same area. In this example, the link 212 is the only link for Urbanspoon. As such, the advertisement 220 of the example GUI of FIG. 11A may correspond to a $10 discount or promotion associated with one or more products or services provided by, or accessible via, Urbanspoon as a whole, e.g., a $10 coupon for any restaurant listed in Urbanspoon.

In the example GUI of FIG. 11B, the user device 102 has displayed the advertisement 220 and the GUI element 214 within the area of the GUI that includes the link 212. In contrast to FIG. 11A, the GUI of FIG. 11B includes multiple links for Urbanspoon, namely link 212 that corresponds to the default application state in Urbanspoon, and links 204A-204C that correspond to application states, or entries, within Urbanspoon for "IHOP," "Denny's," and "Taco Bell." Links 204A-204C have been previously described with reference to Yelp. As such, the advertisement 220 of the example GUI of FIG. 11B may correspond to a $10 discount or promotion associated with any of the entries within Urbanspoon, or with one or more products or services provided by or accessible via Urbanspoon as a whole, in a similar manner as described above.

In the example GUI of FIG. 11C, the user device 102 has displayed the advertisement 220 proximate to the area of the GUI that includes the link 212. Specifically, the user device 102 has displayed the advertisement 220 within an area of the GUI that includes the link 204A that corresponds to the entry in Urbanspoon for "IHOP." Thus, in this example, the advertisement 220 may correspond to a $10 discount or promotion associated only with this entry in Urbanspoon.

FIGS. 12A and 12B illustrate still other example GUIs that may be generated on the user device 102 according to the present disclosure. The example GUIs of FIGS. 12A-12B include many of the same GUI objects (i.e., user selectable links and GUI elements) described above with reference to FIGS. 10A and 11A-11C. Specifically, FIG. 12A shows an example GUI that corresponds to an application state of the search application 126 before a user selects one or more of the link 212, GUI element 214, and advertisement 220 for Urbanspoon. In these examples, Urbanspoon is not available on the user device 102. As such, the user may select any of the link 212, GUI element 214, and advertisement 220 to render Urbanspoon available on the user device 102 using the techniques described above. FIG. 12B, in turn, shows an example GUI 222 of a digital distribution platform (in this example, GOOGLE PLAY®) that enables the user device 102 to render Urbanspoon available on the user device 102 using the above-described techniques. The user device 102 may display the GUI 222 (e.g., via the web browser application 124, or a dedicated native application) after the user has selected one or more of the link 212, GUI element 214, and advertisement 220.

In the example of FIGS. 12A-12B, the user has selected one or more of the link 212, GUI element 214, and advertisement 220 to render Urbanspoon available on the user device 102 by downloading Urbanspoon from GOOGLE PLAY® and installing Urbanspoon on the user device 102. The user may have made the above-described selection(s) because the user was enticed by the advertisement 220 displayed to the user by the search application 126. As such, upon rendering Urbanspoon available on the user device 102, the user device 102 may launch Urbanspoon and set it into an application state that reflects one or more conditions associated with the advertisement 220. For example, the user device 102 may cause Urbanspoon to apply a monetary credit or discount specified by the advertisement 220 with respect to one or more products or services provided via Urbanspoon. The user may then interact with Urbanspoon to take advantage of the monetary credit or discount, e.g., by purchasing one or more products or services through Urbanspoon using the credit or discount. The user device 102 may also set Urbanspoon into the application state associated with the link 212, as described above, while also causing Urbanspoon to reflect the monetary credit or discount specified by the advertisement 220. For example, to set Urbanspoon into the application state, the user device 102 may cause Urbanspoon to perform the one or more operations indicated by the AAM used to generate the link 212. In this manner, the user may use the credit or discount to purchase one or more products or services associated with the application state.

The GUI 222 shown in FIG. 12B includes a GUI element with the text "INSTALL" that the user may select to download and install Urbanspoon on the user device 102. After rendering Urbanspoon available on the user device 102, the user device 102 may display a new GUI of the search application 126, or an updated version of the example GUI of FIG. 12A. In one example, in the updated version of the example GUI, the link 212 may be modified to reflect the fact that Urbanspoon is now available on the user device 102. In this example, one or more of the GUI element 214 and the advertisement 220 may be absent from the modified link 212. The user selecting the modified link 212 may cause the user device 102 to launch Urbanspoon and set it into the application state associated with the link 212. For example, the user device 102 may cause Urbanspoon to perform the one or more operations indicated by the AAM used to generate the link 212, whether received with the AAM or as part of a new or updated AAM, as described above. In other examples, after rendering Urbanspoon available on the user device 102, the user device 102 may launch Urbanspoon and cause it to perform the operations, without displaying a GUI of the search application 126.

The modules and data stores included in the search system 100 and the ad system 106 represent features or functionality that may be included in these systems 100, 106 as they are described in the present disclosure. For example, the search module 112, the data store 114, and the components thereof may represent features included in the search system 100. Similarly, the ad generation module 118, the record generation module 116, the data store 120, and the components thereof may represent features included in the ad system 106. The modules and data stores described herein may be embodied by electronic hardware, software, firmware, or any combination thereof. Depiction of different features or functionality as separate modules or data stores does not necessarily imply whether the modules or data stores are embodied by common or separate electronic hardware, software, or firmware components. In some implementations, the features or functionality associated with one or more of the modules and data stores depicted herein are realized by common electronic hardware, software, or firmware components. In other implementations, the features or functionality may be realized by separate components.

The modules and data stores may be embodied by electronic hardware, software, and/or firmware components including, but not limited to, one or more processing units, one or more memory components, one or more input/output (I/O) components, and one or more interconnect components. The interconnect component(s) may be configured to provide communication between the processing unit(s), the memory component(s), and the I/O component(s). For example, the interconnect component(s) may include one or more buses that are configured to transfer data between electronic components. The interconnect component(s) may also include one or more control circuits (e.g., a memory controller and/or an I/O controller) that are configured to control communication between electronic components.

The processing unit(s) may include one or more central processing units (CPUs), graphics processing units (GPUs), digital signal processing units (DSPs), application specific integrated circuits (ASICs), field programmable gate arrays (FPGAs), or other processing units. The processing unit(s) may be configured to communicate with the memory component(s) and the I/O component(s) e.g., via the interconnect component(s).

A memory component as described herein may include any volatile or non-volatile media. For example, a memory component may include, but is not limited to, electrical media, magnetic media, and/or optical media, such as random access memory (RAM), non-volatile RAM (NVRAM), read-only memory (ROM), electrically-erasable programmable ROM (EEPROM), Flash memory, solid state drives (SSDs), hard disk drives (HDDs), magnetic tape drives, optical storage technology (e.g., compact disc, digital versatile disc, and/or Blu-ray disc), or any other equivalent or similar memory components.

As such, the memory component(s) may include (e.g., store) various types of data. For example, the memory component(s) may store data included in one or more of the function records(s) of the data store 114 and the ad record(s) of the data store 120. The memory component(s) may also include one or more instructions that may be executed by the processing unit(s). For example, the memory component(s) may include one or more computer-readable instructions that, when executed by the processing unit(s), cause the unit(s) to perform the various functions attributed to the modules and data stores described herein.

The I/O component(s) may refer to electronic hardware, software, and/or firmware that provide communication with a variety of different devices. For example, the I/O component(s) may provide communication between other devices and the processing unit(s) and the memory component(s). In some examples, the I/O component(s) is configured to communicate with a computer network, such as the network 110. For example, the I/O component(s) may be configured to exchange data over a computer network using any of a variety of different physical connections, wireless connections, and protocols. The I/O component(s) may include, but are not limited to, one or more network interface components (e.g., a network interface controller), repeaters, network bridges, network switches, routers, and firewalls. In some examples, the I/O component(s) includes hardware, software, and/or firmware that is configured to communicate with various human interface devices, including, but not limited to, display screens, keyboards, pointer devices (e.g., a mouse), touchscreens, speakers, and microphones. In other examples, the I/O component(s) may provide communication with additional devices, such as external memory (e.g., external HDDs).

In some implementations, one or more of the search system 100 and the ad system 106 is a system of one or more computing devices (e.g., a computer search system that includes an ad system or component) that are configured to implement the techniques described herein. In other words, the features or functionality attributed to the modules and data stores described herein may be implemented by one or more computing devices. Each of the computing device(s) may include any combination of electronic hardware, software, and/or firmware, as described above. Additionally, each computing device may include any combination of processing units, memory components, I/O components, and interconnect components, as also described above. The computing device(s) of any of the systems 100, 106 may also include various human interface devices, including, but not limited to, display screens, keyboards, pointing devices (e.g., a mouse), touchscreens, speakers, and microphones. The computing device(s) may also be configured to communicate with additional devices, such as external memory (e.g., external HDDs).

The computing device(s) of any of the search system 100 and the ad system 106 may be configured to communicate with the network 110. The computing device(s) may also be configured to communicate with one another (e.g., within any of, or between, the systems 100, 106) via a computer network. In some examples, the computing device(s) includes one or more server computing devices configured to communicate with user devices, such as the user device(s) 102 or advertiser device(s) 108 (e.g., receive search queries and transmit search results, or receive ad content and related data, generate advertisements, and transmit the advertisements). The server computing device(s) may also gather data from the data source(s) 104, index the data, and store the data, as well as gather, index, and/or store other documents or information. The computing device(s) of any of the systems 100, 106 may reside within a single machine or within multiple machines at a single geographic location, or may be distributed across a number of geographic locations.

Additionally, the various implementations of the search system 100 and the ad system 106 described above (e.g., using one or more computing devices that include one or more processing units, memory components, I/O components, and interconnect components) are equally applicable to any of the user device(s) 102 and the advertiser device(s) 108, as well as the various components thereof, as described herein.

Figure 13:
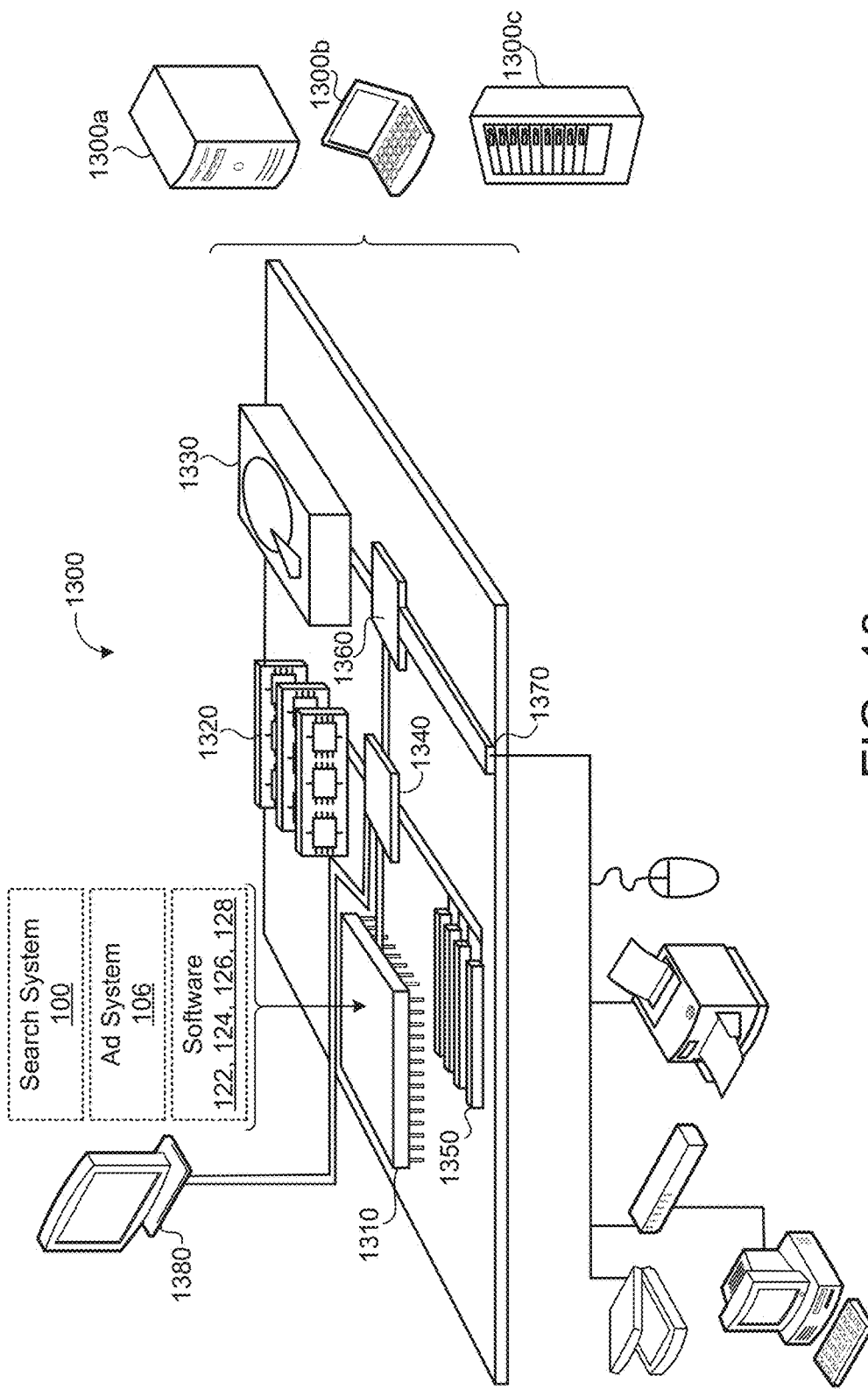
FIG. 13 is a schematic view of an example computing device executing any systems or methods described herein.

FIG. 13 is schematic view of an example computing device 1300 that may be used to implement the systems and methods described in this document. The computing device 1300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1300 includes a processor 1310, memory 1320, a storage device 1330, a high-speed interface/controller 1340 connecting to the memory 1320 and high-speed expansion ports 1350, and a low speed interface/controller 1360 connecting to low speed bus 1370 and storage device 1330. Each of the components 1310, 1320, 1330, 1340, 1350, and 1360, are interconnected using various busses, and may be mounted on a common motherboard or in other manners as appropriate. The processor 1310 may process instructions for execution within the computing device 1300, including instructions stored in the memory 1320 or on the storage device 1330 to display graphical information for a graphical user interface (GUI) on an external input/output device, such as display 1380 coupled to high speed interface 1340. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1320 stores information non-transitorily within the computing device 1300. The memory 1320 may be a computer-readable medium, a volatile memory unit(s), or non-volatile memory unit(s). The non-transitory memory 1320 may be physical devices used to store programs (e.g., sequences of instructions) or data (e.g., program state information) on a temporary or permanent basis for use by the computing device 1300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1330 is capable of providing mass storage for the computing device 1300. In some implementations, the storage device 1330 is a computer-readable medium. In various different implementations, the storage device 1330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1320, the storage device 1330, or memory on processor 1310.

The high speed controller 1340 manages bandwidth-intensive operations for the computing device 1300, while the low speed controller 1360 manages lower bandwidth-intensive operations. Such allocation of duties is exemplary only. In some implementations, the high-speed controller 1340 is coupled to the memory 1320, the display 1380 (e.g., through a graphics processor or accelerator), and to the high-speed expansion ports 1350, which may accept various expansion cards (not shown). In some implementations, the low-speed controller 1360 is coupled to the storage device 1330 and low-speed expansion port 1370. The low-speed expansion port 1370, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1300 may be implemented in a number of different forms, as shown in the figure. For example, it may be implemented as a standard server 1300*a* or multiple times in a group of such servers 1300*a*, as a laptop computer 1300*b*, or as part of a rack server system 1300*c*.

Various implementations of the systems and techniques described here may be realized in digital electronic and/or optical circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification may be implemented in digital electronic circuitry, or in computer software, firmware, or hardware, including the structures disclosed in this specification and their structural equivalents, or in combinations of one or more of them. Moreover, subject matter described in this specification may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, one or more aspects of the disclosure may be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user may provide input to the computer. Other kinds of devices may be used to provide interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

One or more aspects of the disclosure may be implemented in a computing system that includes a backend component, e.g., as a data server, or that includes a middleware component, e.g., an application server, or that includes a frontend component, e.g., a client computer having a graphical user interface or a Web browser through which a user may interact with an implementation of the subject matter described in this specification, or any combination of one or more such backend, middleware, or frontend components. The components of the system may be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) may be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims may be performed in a different order and still achieve desirable results.

What is claimed is:

1. A method comprising:

receiving, by a search system via a network, a search query from a user device executing an application;

performing, by the search system, a search of a data store using the search query, the data store including function records, each function record including an application access mechanism (AAM) specifying a native application and indicating one or more operations for the native application to perform, and application state information (ASI) describing a state of the native application after the native application has performed the one or more operations;

identifying, by the search system, one or more function records during the search of the data store based on matches between terms of the search query and terms of the ASI included in each identified function record;

selecting, by the search system, one or more AAMs from the identified one or more function records;

determining that a native application specified by at least one of the selected one or more AAMs is unavailable on the user device;

generating an advertisement for the determined native application that is unavailable on the user device; and transmitting, via the network, the selected one or more AAMs and the generated advertisement to the user device executing the application.

2. The method of claim 1, wherein the determining that the native application specified by the at least one of the selected one or more AAMs is unavailable on the user device comprises:

receiving device application information indicating one or more native applications that are available on the user device;

comparing each of one or more native applications specified by the selected one or more AAMs to each of the one or more native applications indicated by the device application information; and determining that the native application specified by the at least one of the selected one or more AAMs is unavailable on the user device based on the comparison.

3. The method of claim 2, wherein the receiving of the device application information comprises one of:

transmitting an application information query to the user device, and receiving the device application information from the user device in response to the transmitted application information query; and retrieving the device application information from a device other than the user device.

4. The method of claim 1, wherein the determining that the native application specified by the at least one of the selected one or more AAMs is unavailable on the user device comprises:

after transmitting the selected one or more AAMs to the user device, receiving an indication that the native application specified by the at least one of the selected one or more AAMs is unavailable on the user device from the user device; and determining that the native application specified by the at least one of the selected one or more AAMs is unavailable on the user device based on the indication.

5. The method of claim 1, further comprising transmitting link data for each of the selected one or more AAMs, the link data including one or more of image data and text data to be used by the user device to generate a user selectable link for the AAM.

6. The method of claim 1, further comprising transmitting an application download address (ADA) for the native application that is unavailable on the user device that indicates a web location from which the user device can download the native application.

7. The method of claim 1, further comprising transmitting placement information indicating relative placement of the generated advertisement and the selected one or more AAMs on a display device.

8. The method of claim 1, further comprising transmitting advertisement data indicating one or more operations for the native application that is/are unavailable on the user device to perform that cause the native application to reflect one or more conditions of the generated advertisement.

9. The method of claim 1, wherein the transmitting of the selected one or more AAMs and the generated advertisement to the user device comprises refraining from transmitting the one or more operations indicated by the at least one of the selected one or more AAMs specifying the native application that is unavailable on the user device to the user device.

10. The method of claim 9, further comprising:

after transmitting the selected one or more AAMs and the generated advertisement to the user device, receiving an indication indicative of the native application being available on the user device; and transmitting the one or more operations indicated by the at least one of the selected one or more AAMs specifying the native application to the user device.

11. The method of claim 1, wherein the generated advertisement for the native application that is unavailable on the user device indicates a monetary discount associated with one of the native application and the state of the native application after the native application has performed the one or more operations indicated by one of the at least one of the selected one or more AAMs specifying the native application.

12. A system comprising:

a data store including function records, each function record including an application access mechanism (AAM) that specifies a native application and indicates one or more operations for the native application to perform, and application state information (ASI) that describes a state of the native application after the native application has performed the one or more operations;

and one or more computing devices configured to:

receive, via a network, a search query from a user device executing an application;

perform a search of the data store using the search query;

identify one or more function records during the search of the data store based on matches between terms of the search query and terms of the ASI included in each identified function record;

select one or more AAMs from the identified one or more function records;

determine that a native application specified by at least one of the selected one or more AAMs is unavailable on the user device;

generate an advertisement for the native application that is unavailable on the user device; and transmit, via the network, the selected one or more AAMs and the generated advertisement to the user device executing the application.

13. The system of claim 12, wherein the determining that the native application specified by the at least one of the selected one or more AAMs is unavailable on the user device comprises the one or more computing devices being configured to:

receive device application information indicating one or more native applications that are available on the user device;

compare each of one or more native applications specified by the selected one or more AAMs to each of the one or more native applications indicated by the received device application information; and determine that a native application specified by at least one of the selected one or more AAMs is unavailable on the user device based on the comparison.

14. The system of claim 13, wherein the receiving of the device application information comprises the one or more computing devices being configured to perform one of:

transmitting an application information query to the user device, and receiving the device application information from the user device in response to the transmitted application information query; or retrieving the device application information from a device other than the user device.

15. The system of claim 12, wherein the determining that the native application specified by the at least one of the selected one or more AAMs is unavailable on the user device comprises the one or more computing devices being configured to:

after transmitting the selected one or more AAMs to the user device, receive an indication that a native application specified by at least one of the selected one or more AAMs is unavailable on the user device from the user device; and determine that a native application specified by at least one of the selected one or more AAMs is unavailable on the user device based on the indication.

16. The system of claim 12, wherein the one or more computing devices are further configured to transmit one or more of an application download address (ADA) for the native application that is unavailable on the user device that indicates a web location from which the user device can download the native application, and advertisement data that indicates one or more operations for the native application to perform that cause the native application to reflect one or more conditions of the generated advertisement.

17. The system of claim 12, wherein the transmitting of the selected one or more AAMs and the generated advertisement to the user device comprises the one or more computing devices being configured to refrain from transmitting the one or more operations indicated by the at least one of the selected one or more AAMs specifying the native application that is unavailable on the user device to the user device.

18. The system of claim 17, wherein the one or more computing devices are further configured to:
   after transmitting the selected one or more AAMs and the generated advertisement to the user device, determine that the native application is available on the user device; and
   transmit the one or more operations indicated by the at least one of the selected one or more AAMs specifying the native application to the user device.

* * * * *